US012602800B2

(12) United States Patent
Iwata

(10) Patent No.: US 12,602,800 B2
(45) Date of Patent: Apr. 14, 2026

(54) TIRE STATE ESTIMATION METHOD

(71) Applicant: Sumitomo Rubber Industries, Ltd.,
Kobe (JP)

(72) Inventor: Mariko Iwata, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 6 days.

(21) Appl. No.: 18/698,381

(22) PCT Filed: Sep. 20, 2022

(86) PCT No.: PCT/JP2022/034916
§ 371 (c)(1),
(2) Date: Apr. 4, 2024

(87) PCT Pub. No.: WO2023/058445
PCT Pub. Date: Apr. 13, 2023

(65) Prior Publication Data
US 2025/0238942 A1     Jul. 24, 2025

(30) Foreign Application Priority Data

Oct. 6, 2021     (JP) ................................. 2021-164969

(51) Int. Cl.
G06T 7/50 (2017.01)
B60C 11/24 (2006.01)
(Continued)

(52) U.S. Cl.
CPC .............. G06T 7/50 (2017.01); B60C 11/246 (2013.01); G06T 7/0002 (2013.01); G07C 5/006 (2013.01);
(Continued)

(58) Field of Classification Search
CPC ...... B60C 11/246; B60C 19/00; G01M 17/02; G01M 17/027; G06T 2207/20081;
(Continued)

(56) References Cited

U.S. PATENT DOCUMENTS 9,805,697 B1 * 10/2017 Dorrance .............. B60C 99/006
9,880,075 B2 * 1/2018 Finch ................. G01N 21/8851
(Continued)

FOREIGN PATENT DOCUMENTS

CN          111257019 A      6/2020
DE     102012112016 A1      6/2014
(Continued)

OTHER PUBLICATIONS

International Search Report and Written Opinion mailed on Dec. 6, 2022, received for PCT Application PCT/JP2022/034916, filed on Sep. 20, 2022, 15 pages including English Translation.
(Continued)

*Primary Examiner* — Babar Sarwar
(74) *Attorney, Agent, or Firm* — XSENSUS LLP

(57)     ABSTRACT

Provided is a method, etc., for estimating uneven tire wear. This tire state estimation method involves: obtaining an image which includes both ends of the tread of a target tire, and captures said tread from the front in a manner such that said tread is continuous in a prescribed direction; inputting the obtained image into a trained first machine learning model; and deriving an output from the trained first machine learning model. Therein, the output of the trained first machine learning model corresponds to the estimation results for the uneven wear of the target tire.

15 Claims, 14 Drawing Sheets

(51) Int. Cl.
  *G06T 7/00* (2017.01)
  *G07C 5/00* (2006.01)
(52) U.S. Cl.
  CPC .... *G07C 5/008* (2013.01); *G06T 2207/20081* (2013.01); *G06T 2207/20084* (2013.01)
(58) Field of Classification Search
  CPC ......... G06T 2207/20084; G06T 7/0002; G06T 7/50; G07C 5/006; G07C 5/008
  See application file for complete search history.

(56) References Cited

U.S. PATENT DOCUMENTS

| | | | | |
|---|---|---|---|---|
| 10,006,836 | B2 * | 6/2018 | Monti ................. | G01M 17/027 |
| 10,267,710 | B2 * | 4/2019 | Regoli .............. | G01B 11/0608 |
| 2015/0075271 | A1 * | 3/2015 | Tracy ................. | G01M 17/027 |
| | | | | 73/146 |
| 2016/0121945 | A1 * | 5/2016 | Rust ....................... | B62D 55/14 |
| | | | | 305/15 |
| 2017/0190223 | A1 * | 7/2017 | Fish ....................... | G06T 17/00 |
| 2017/0254727 | A1 * | 9/2017 | Zoken ................... | G01B 11/24 |
| 2018/0043949 | A1 * | 2/2018 | Boily .................... | B60K 35/10 |
| 2018/0172557 | A1 * | 6/2018 | Ghidotti Piovan ..... | G06T 7/001 |
| 2018/0190045 | A1 * | 7/2018 | Richard ............... | B62D 55/244 |
| 2018/0265145 | A1 * | 9/2018 | Todd ...................... | B60K 31/00 |
| 2020/0001662 | A1 * | 1/2020 | Storti ................... | B60C 11/246 |
| 2020/0031184 | A1 | 1/2020 | Ukegawa et al. | |

| | | | | |
|---|---|---|---|---|
| 2020/0070906 | A1 * | 3/2020 | Laperle ................. | B60T 8/1725 |
| 2020/0125887 | A1 * | 4/2020 | Nishii .................. | G06N 3/0464 |
| 2020/0130420 | A1 | 4/2020 | Puranik | |
| 2021/0197625 | A1 * | 7/2021 | Laperle ............... | G01M 17/013 |
| 2022/0055699 | A1 * | 2/2022 | Desmarais .......... | B62D 55/244 |

FOREIGN PATENT DOCUMENTS

| | | | | |
|---|---|---|---|---|
| JP | 2009-102009 | A | 5/2009 | |
| JP | 2018-020752 | A | 2/2018 | |
| JP | 2019-035626 | A | 3/2019 | |
| JP | 2019-184405 | A | 10/2019 | |
| JP | 2021-063703 | A | 4/2021 | |
| JP | 2021-128696 | A | 9/2021 | |
| JP | 2021-524040 | A | 9/2021 | |
| JP | 2021-165915 | A | 10/2021 | |
| KR | 2019-0129202 | A | 11/2019 | |
| WO | WO-2020205640 | A1 * | 10/2020 | ........... B60C 11/246 |
| WO | WO-2024194037 | A1 * | 9/2024 | ........ B24B 27/0038 |

OTHER PUBLICATIONS

Extended European search report issued on Nov. 22, 2024, in corresponding European patent Application No. 22878316.3, 15 pages.

Office Action issued on Jan. 29, 2026, in corresponding Indian patent Application No. 202417032538, 9 pages.

\* cited by examiner

FIG. 5B

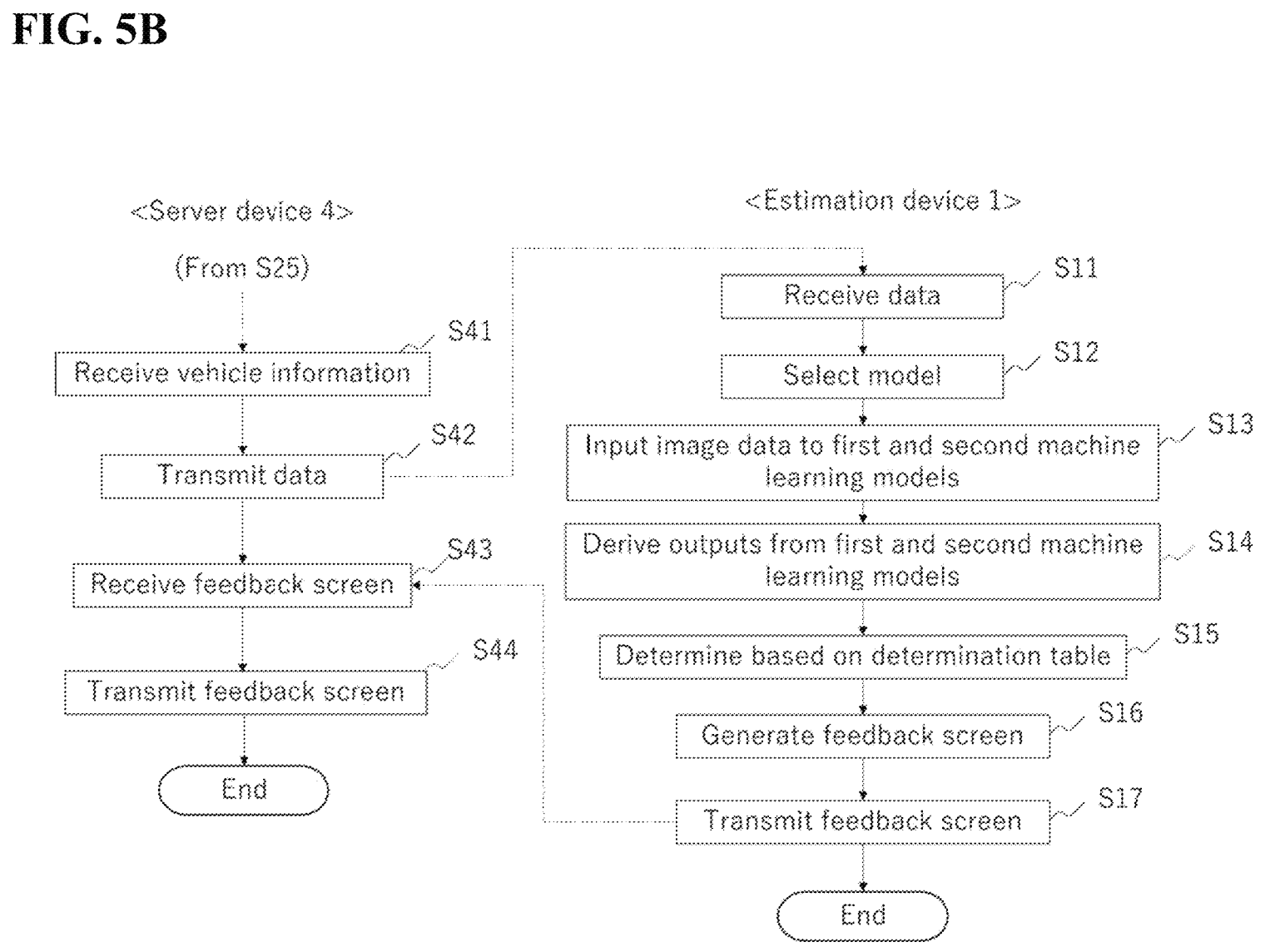

\<Estimation device 1\>

Receive data — S11

Select model — S12

Input image data to first and second machine learning models — S13

Derive outputs from first and second machine learning models — S14

Determine based on determination table — S15

Generate feedback screen — S16

Transmit feedback screen — S17

End

\<Server device 4\>

(From S25)

Receive vehicle information — S41

Transmit data — S42

Receive feedback screen — S43

Transmit feedback screen — S44

End

| | | Level of wear amount | | |
|---|---|---|---|---|
| | | 1 | 2 | 3 |
| Level of uneven wear | 1 | A1 | A2 | A3 |
| | 2 | A2 | A2 | A3 |
| | 3 | A3 | A3 | A3 |

1

TIRE STATE ESTIMATION METHOD

CROSS-REFERENCE TO RELATED APPLICATIONS

The present application is based on PCT/JP2022/034916, filed Sep. 20, 2022, which claims priority from Japanese Patent Application No. 2021-164969, filed on Oct. 6, 2021, and the entire contents of each are incorporated herein by reference.

TECHNICAL FIELD

The present invention relates to a tire state estimation method, an estimation device, an estimation system, an estimation program, and a trained model generation method.

BACKGROUND ART

JP 2021-524040A1 (Patent Document 1) discloses a method for estimating a tread wear value of a tire using a machine learning model. The machine learning model collects and uses sensor data such as a steering wheel angle, a wheel speed, a longitudinal acceleration, a brake pressure, and a total travel distance obtained from in-vehicle sensors, and estimates tread wear of each tire.

CITATION LIST

Patent Literature

Patent Document 1: JP 2021-524040A1

SUMMARY OF INVENTION

Technical Problem

Incidentally, on a tread, not only uniform wear over the entire tread but also concentrated wear on a specific portion and wear in which a characteristic pattern appears over the circumferential direction of the tire may occur. Such a phenomenon is also referred to as uneven wear. If the uneven wear is left unattended, the tire is likely to be damaged, slip is likely to occur, or comfortable traveling of the vehicle becomes difficult. Therefore, it is important to find uneven wear at an early stage and take measures such as tire replacement and tire rotation. However, uneven wear may occur when an amount of wear of the tread is smaller than a prescribed value, and it is often not possible to find uneven wear by simply estimating the amount of wear of the tread. This point is not considered in Patent Document 1.

An object of the present disclosure is to provide a method, a device, a system, and a program for estimating uneven wear of a tire as a state of the tire, and a trained model generation method.

Solution to Problem

A tire state estimation method according to one aspect of the present disclosure includes:

acquiring an image of a tread of a target tire from a front side, the image being obtained such that the image includes both ends of the tread and the tread is continuous in a predetermined direction;

inputting the acquired image to a trained first machine learning model; and

2 deriving an output from the trained first machine learning model.

Here, the output from the trained first machine learning model corresponds to an estimation result of uneven wear of the target tire.

The method may further include: determining whether or not the target tire is required to be replaced based on the output derived from the trained first machine learning model.

The method may further include: generating a determination result display screen that displays a result of the determination as to whether or not the target tire is required to be replaced.

The method may further include: inputting the acquired image to a trained second machine learning model that is different from the first machine learning model; and deriving an output from the trained second machine learning model. Here, the output from the trained second machine learning model corresponds to an estimation result of a depth of a groove of the tread of the target tire. Further, the determining whether or not the target tire is required to be replaced may be determining whether or not the target tire is required to be replaced based on the output derived from the trained first machine learning model and the output derived from the trained second machine learning model.

In the above method, the estimation result of the uneven wear of the target tire may be an estimation result of a degree of uneven wear of the tread, and represented by an index indicating the degree of the uneven wear in stages.

The method may further include: generating an estimation result display screen that displays an index corresponding to the output derived from the first machine learning model together with positioning of the index indicating the degree of the uneven wear in stages with respect to entire indexes.

In the above method, the estimation result of the uneven wear of the target tire may be an estimation result of a type of the uneven wear.

The method may further include: acquiring information on an attachment position of the target tire on a vehicle; and determining a recommended pattern based on the acquired information on the attachment position and the output derived from the first machine learning model, the recommended pattern being a tire rotation pattern that is recommended.

The method may further include: generating a rotation screen that displays the determined recommended pattern.

The method may further include: bringing data of the determination result display screen into an accessible state via a network; and generating a two-dimensional code for accessing the data of the determination result display screen via a network.

The method may further include: bringing data of the estimation result display screen into an accessible state via a network; and generating a two-dimensional code for accessing the data of the estimation result display screen via a network.

A tire state estimation device according to one aspect of the present disclosure includes: an image acquisition unit; a storage unit; and a derivation unit. The image acquisition unit acquires an image of a tread of a target tire from a front side, the image being obtained such that the image includes both ends of the tread and the tread is continuous in a predetermined direction. The storage unit stores a trained machine learning model. The derivation unit inputs the acquired image to the trained machine learning model, and derives an output from the trained machine learning model.

Here, the output from the trained machine learning model corresponds to an estimation result of uneven wear of the target tire.

The tire state estimation device may further include: a screen generation unit that generates an estimation result display screen that displays the estimation result corresponding to the output derived from the trained machine learning model.

A tire state estimation system according to one aspect of the present disclosure may include: the estimation device including the screen generation unit; a camera, and a display. The camera obtains an image of the tread of the target tire. The display displays the estimation result display screen.

A tire state estimation program according to one aspect of the present disclosure causes a computer to execute the steps including:

acquiring an image of a tread of a target tire from a front side, the image being obtained such that the image includes both ends of the tread and the tread is continuous in a predetermined direction;

inputting the acquired image to a trained first machine learning model; and deriving an output from the trained first machine learning model.

Here, the output from the trained first machine learning model corresponds to an estimation result of uneven wear of the target tire.

A trained model generation method according to one aspect of the present disclosure includes:

preparing data for learning that is a data set of an image for learning and correct answer data, the image for learning being obtained such that the image includes both ends of a tread of a tire and the tread is continuous in a predetermined direction; and adjusting a parameter of a machine learning model such that using the data for learning, data corresponding to the correct answer data is output when an image of a tread of a target tire from a front side obtained such that the image includes both ends of the tread and the tread is continuous in a predetermined direction is input.

Here, the correct answer data is at least one of an index indicating a degree of the uneven wear of the tire in the image for learning and a label corresponding to a type of the uneven wear of the tire in the image for learning.

A tire state estimation method according to one aspect of the present disclosure includes:

acquiring an image including a tread of a target tire;

inputting the acquired image to a trained first machine learning model;

deriving an output from the trained first machine learning model;

inputting the acquired image to a trained second machine learning model that is different from the trained first machine learning model;

deriving an output from the trained second machine learning model; and determining whether or not the target tire is required to be replaced based on the output derived from the trained first machine learning model and the output derived from the trained second machine learning model.

Here, the output from the trained first machine learning model corresponds to an estimation result of uneven wear of the target tire, and the output from the trained second machine learning model corresponds to an estimation result of a depth of a groove of the tread of the target tire.

A tire state estimation device according to one aspect of the present disclosure includes: an image acquisition unit; a storage unit; a derivation unit; and a determination unit. The image acquisition unit acquires an image including a tread of a target tire. The storage unit stores a trained first machine learning model and a trained second machine learning model that is different from the trained first machine learning model. The derivation unit inputs the acquired image to the trained first machine learning model and to the trained second machine learning model, and derives outputs respectively from the trained first machine learning model and from the trained second machine learning model. The determination unit determines whether or not the target tire is required to be replaced based on the outputs derived respectively from the trained first machine learning model and the trained second machine learning model.

Here, the output from the trained first machine learning model corresponds to an estimation result of uneven wear of the target tire, and the output from the trained second machine learning model corresponds to an estimation result of a depth of a groove of the tread of the target tire.

A tire state estimation program according to one aspect of the present disclosure causes a computer to execute the steps including:

acquiring an image including a tread of a target tire;

inputting the acquired image to a trained first machine learning model;

inputting the acquired image to a trained second machine learning model that is different from the trained first machine learning model;

deriving an output from the trained first machine learning model;

deriving an output from the trained second machine learning model; and determining whether or not the target tire is required to be replaced based on the output derived from the trained first machine learning model and the output derived from the trained second machine learning model.

Here, the output from the trained first machine learning model corresponds to an estimation result of uneven wear of the target tire, and the output from the trained second machine learning model corresponds to an estimation result of a depth of a groove of the tread of the target tire.

A tire state estimation method according to one aspect of the present disclosure includes:

acquiring an image including a tread of a target tire;

inputting the acquired image to a trained first machine learning model; and deriving an output from the trained first machine learning model.

Here, the output from the trained first machine learning model corresponds to an estimation result of uneven wear of the target tire.

A tire state estimation device according to one aspect of the present disclosure includes: an image acquisition unit; a storage unit; and a derivation unit. The image acquisition unit acquires an image including a tread of a target tire. The storage unit stores a trained machine learning model. The derivation unit inputs the acquired image to the trained machine learning model, and derives an output from the trained machine learning model. Here, the output from the trained machine learning model corresponds to an estimation result of uneven wear of the target tire.

A tire state estimation program according to one aspect of the present disclosure causes a computer to execute the steps including:

acquiring an image including a tread of a target tire;

inputting the acquired image to a trained first machine learning model; and deriving an output from the trained first machine learning model.

Here, the output from the trained first machine learning model corresponds to an estimation result of uneven wear of the target tire.

A trained model generation method according to one aspect of the present disclosure includes:

preparing data for learning that is a data set of an image for learning and correct answer data, the image for learning including a tread of a tire; and adjusting a parameter of a machine learning model such that using the data for learning, data corresponding to the correct answer data is output when an image including a tread of a target tire is input.

Here, the correct answer data is at least one of an index indicating a degree of the uneven wear of the tire in the image for learning and a label corresponding to a type of the uneven wear of the tire in the image for learning.

Advantageous Effects of Invention

According to the above aspect, a technique of estimating uneven wear of a target tire from an image of the tire is provided.

BRIEF DESCRIPTION OF DRAWINGS

FIG. 5B is a flowchart showing a flow of processing performed by the server device and the estimation device in the estimation system.

FIG. 8 shows an example of a determination table stored in the estimation device.

DESCRIPTION OF EMBODIMENTS

Hereinafter, an estimation method, an estimation device, an estimation system, and an estimation program of a tire state, and a trained model generation method according to an embodiment of the present disclosure will be described. The tire state includes a state of uneven wear of a tire.

1. Overview of Estimation System

Figure 1:
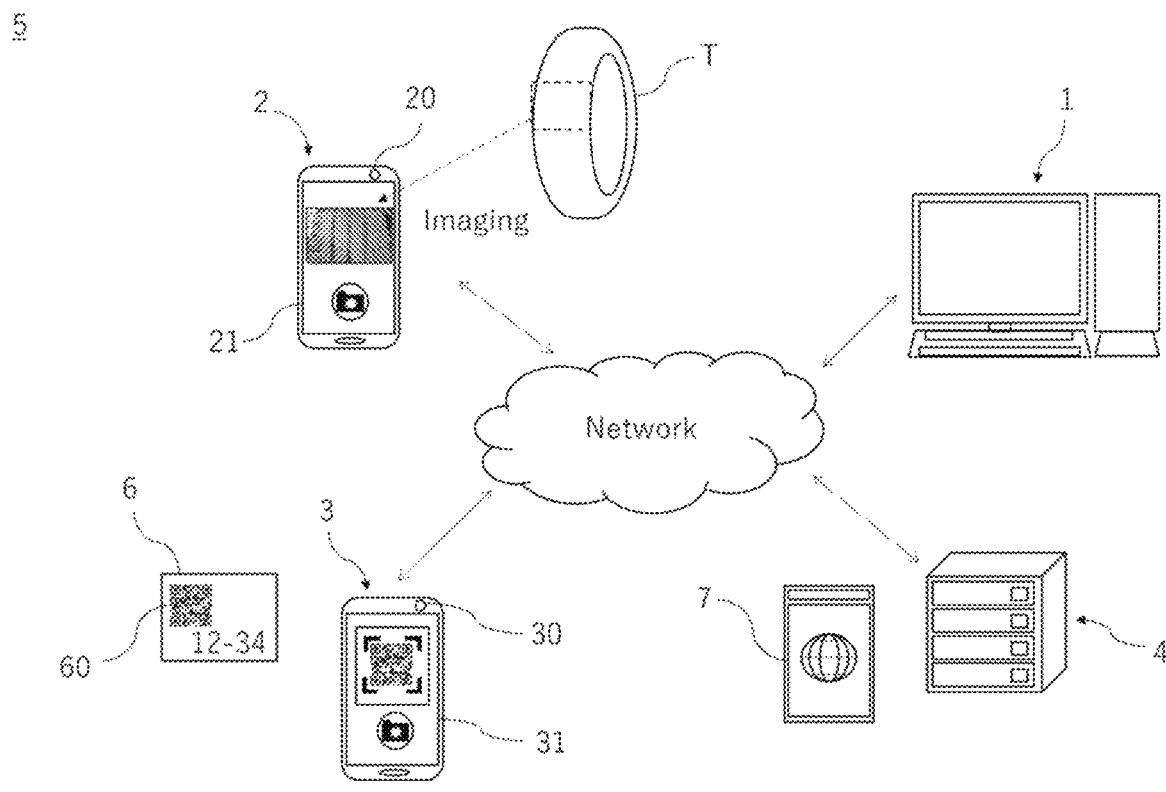
FIG. 1 is a diagram illustrating an entire configuration of an estimation system of a tire state according to an embodiment.

FIG. 1 is an entire configuration diagram of an estimation system 5 according to an embodiment of the present disclosure. The estimation system 5 is a system for estimating uneven wear and a wear amount of a tire T as a state of the tire T, and feeding back an estimation result and a response (tire replacement, tire rotation, and the like) recommended based on the estimation result. It is assumed that a main user of the estimation system 5 according to the present embodiment is, but not limited to, a person who provides a tire inspection service to a driver of a vehicle.

The estimation system 5 includes an estimation device 1 that estimates the state of the tire T, a camera 20 that takes an image of the tire T, and a display 21 that displays an estimation result of the state and the like. The camera 20 is an imaging device that generates digital image data of a subject. The camera 20 is built in a portable information processing terminal connected to a network such as the Internet, examples of the portable information processing terminal including a smartphone, a tablet, a laptop personal computer, a smart watch, and a mobile phone with a push button. The display 21 is a display device that displays various types of information including an image obtained by the camera 20. The display 21 is, for example, a touch panel display, a liquid crystal display, an organic EL display, a liquid crystal display element, a plasma display, or the like provided for the information processing terminal having the camera 20 built-in. In the present embodiment, the camera 20 is a camera built in the smartphone 2 used by the user, and the display 21 is a touch panel display provided for the smartphone 2.

As will be described later in detail, estimation of the uneven wear and the wear amount of the tire T is performed on the basis of a first machine learning model 130 and a second machine learning model 131 (see FIG. 4) to which the image including the tread of the tire T generated by the camera 20 is input. An output from the first machine learning model 130 corresponds to an estimation result of the uneven wear of the tire T, and an output from the second machine learning model 131 corresponds to an estimation result of the wear amount of the tire T. The estimation device 1 comprehensively determines outputs derived from the first and second machine learning models 130 and 131, and generates a feedback screen G3 (see FIG. 9A) that displays at least one of an estimation result that displays the estimation result for the tire T and a countermeasure recommended to the driver. The feedback screen G3 is stored in a server device 4 as web data 7 described later. As a result, the feedback screen G3 is displayed on the display of the information processing terminal in response to a request from the information processing terminal via the network.

By displaying the feedback screen G3 on the display 21, the user can explain a current state and a recommended countermeasure of the tire T while showing the feedback screen G3 to the driver, and propose a service that can be provided by the user as necessary. In addition, if the driver owns an information processing terminal connected to a network, such as a smartphone, a tablet, a laptop personal computer, a smart watch, a desktop personal computer, and a mobile phone with a push button (In the present embodiment, a smartphone 3), the driver can access the web data 7 through the information processing terminal via the network and display the feedback screen G3 on the display 31 of the information processing terminal. As a result, the driver can also confirm the feedback screen G3 by himself/herself without being restricted by location and time.

Hereinafter, details of components of the estimation system 5 are described, and then configurations of the first and second machine learning models 130 and 131, an estimation method based on the first and second machine learning models 130 and 131, and a learning method of the first and second machine learning models 130 and 131 will be described in order.

2. Configuration of Components

Estimation Device

Figure 2:
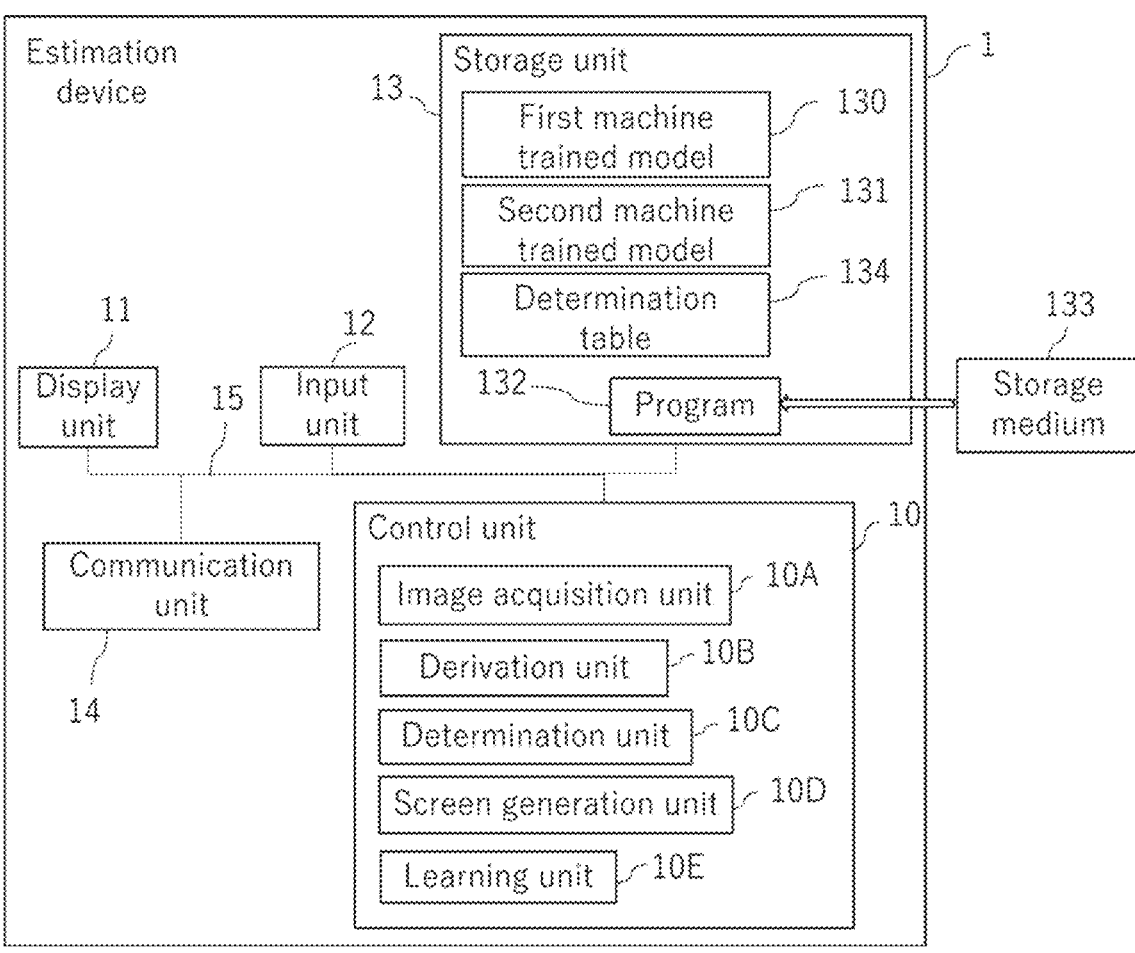
FIG. 2 is a block diagram illustrating an electrical configuration of an estimation device.

FIG. 2 is a block diagram illustrating an electrical configuration of the estimation device 1. The estimation device 1 is a general-purpose computer as hardware, and is realized as, for example, a desktop personal computer, a laptop personal computer, a tablet, or a smartphone. The estimation device 1 is manufactured by installing a program 132 in a general-purpose computer from a computer-readable storage medium 133 such as a CD-ROM or a USB memory or via a network. The program 132 is software for estimating a state of the tire T shown in an image on the basis of image data 201 (see FIG. 4) transmitted from the smartphone 2, determines whether or not any countermeasure is necessary on the basis of the estimation result, and determines a recommended countermeasure. The program 132 causes the estimation device 1 to execute an operation described later.

The estimation device 1 includes a control unit 10, a display unit 11, an input unit 12, a storage unit 13, and a communication unit 14. These units 10-14 are connected to each other via a bus line 15 and can communicate with each other. The display unit 11 can be configured by a liquid crystal display or the like, and displays a code of a machine learning model described later, an error in a learning process of the machine learning model, and the like. Such a display can be used by a person who mainly trains the machine learning model and generates the machine learning models 130 and 131 that have been trained. The input unit 12 can be configured by a mouse, a keyboard, a touch panel, and the like, and accepts an operation to the estimation device 1.

The storage unit 13 can be configured by a non-volatile memory such as a hard disk and a flash memory. The storage unit 13 stores not only the program 132 but also data including the image data 201 transmitted from the smartphone 2 as appropriate. In addition, the storage unit 13 stores information that defines the first machine learning model 130 and the second machine learning model 131 trained in learning processing described later and used in estimation processing described later. Furthermore, the storage unit 13 stores a determination table 134 for comprehensively determining the estimation results by these machine learning models and determining a recommended countermeasure. Details of the determination table 134 will be described later.

The control unit 10 can be configured by a central processing unit (CPU), a graphics processing unit (GPU), a ROM, a RAM, and the like. The control unit 10 reads and executes the program 132 in the storage unit 13 to virtually operate as an image acquisition unit 10A, a derivation unit 10B, a determination unit 10C, a screen generation unit 10D, and a learning unit 10E. The image acquisition unit 10A acquires the image data 201 to be input to the first machine learning model 130 and the second machine learning model 131. The derivation unit 10B inputs the image data 201 to the first machine learning model 130 and the second machine learning model 131, and derives outputs from the respective machine learning models. The determination unit 10C determines whether tire replacement or tire rotation is necessary based on the outputs derived by the derivation unit 10B and the determination table 134. The screen generation unit 10D generates a feedback screen that displays a determination result or the like by the determination unit 10C. The communication unit 14 functions as a communication interface that performs data communication via a network. The learning unit 10E will be described later.

User-Side Smartphone

Figure 3:
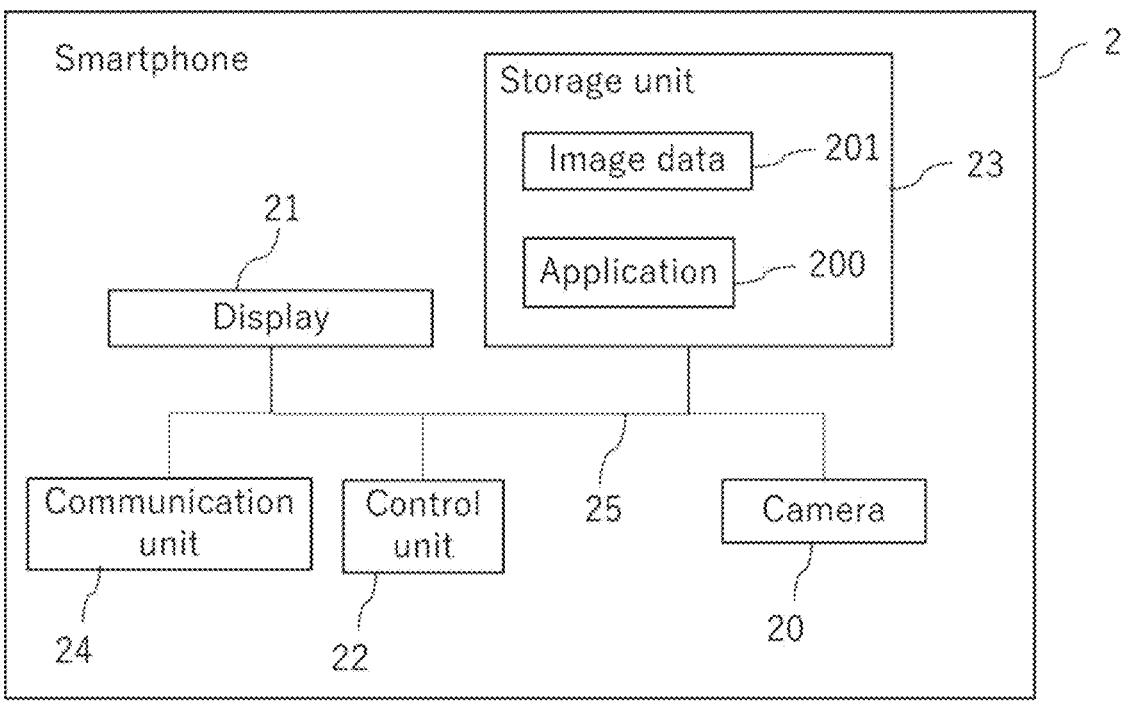
FIG. 3 is a block diagram illustrating an electrical configuration of an information processing terminal on a user side.

FIG. 3 is a block diagram illustrating an electrical configuration of an information processing terminal including the camera 20 and the display 21 constituting the estimation system 5. The information processing terminal is a device for a user to provide a tire inspection service, and is configured as the smartphone 2 in the present embodiment as described above. In the present embodiment, the smartphone 2 is a general-purpose smartphone, and includes a control unit 22, a storage unit 23, and a communication unit 24 in addition to the camera 20 and the display 21. These units 20-24 are connected to each other via a bus line 25 and can communicate with each other. The display 21 is a touch panel display as described above, and is configured to accept an operation by the user and display various types of information. The communication unit 24 functions as a communication interface that performs data communication via a network.

The control unit 22 can be configured by a CPU, a GPU, a ROM, a RAM, and the like. The storage unit 23 can be configured by a non-volatile memory such as a flash memory. The storage unit 23 stores not only the image data 201 obtained by the camera 20, but also a dedicated application program 200 (hereinafter, it is also simply referred to as "application 200") for the estimation system 5. The application 200 is installed in the smartphone 2 via a network, for example. When the user starts the application 200, the camera 20, the display 21, and the like are controlled to operate as a part of the estimation system 5. The application 200 displays various information on the display 21 in cooperation with the web data 7 as necessary, and supports the operation of the user for executing estimation processing of the state of the tire T described later.

Server Device

The server device 4 as hardware is a general-purpose computer, and includes a non-volatile rewritable storage device. The storage device stores the web data 7 constituting a dedicated website related to the estimation system 5 in a network to which the estimation device 1, the smartphone 2, and the smartphone 3 are connected. The web data 7 is data including content data of a web site such as data of a screen displayed on a display of each information processing terminal. The web data 7 may be accessible from a smartphone, a tablet, a laptop personal computer, a smart watch, a desktop personal computer, and a mobile phone with a push button via a general-purpose web browser.

The storage device of the server device 4 further includes a vehicle information database. The vehicle information is identification information issued by the user to a target vehicle when the estimation processing of the state of the tire T is performed, and the form of the vehicle information is not particularly limited as long as the vehicle information is information that can distinguish the vehicle in the estimation system 5. The vehicle information may be, for example, a number of a license plate of the vehicle, a number assigned to the driver for service provision, date and time when the estimation processing is started, and a number obtained by combining the above. As will be described later, the server device 4 acquires vehicle information via the application 200 activated by the smartphone 2. The server device 4 stores the acquired vehicle information in its own storage device and constructs a vehicle information database.

In addition, the server device 4 acquires the feedback screen G3 generated by the estimation device 1 in the estimation processing described later. The server device 4 allocates a unique Uniform Resource Locator (URL) to the acquired feedback screen G3, associates the URL with the corresponding vehicle information stored in the vehicle information database, and stores the URL as the web data 7. As a result, a general information processing terminal such as the smartphone 3 can access the feedback screen G3 via the network. However, in the present embodiment, the feedback screen cannot be reached unless the information processing terminal first accesses a dedicated website and inputs target vehicle information in a form screen displayed on the display of the information processing terminal.

Card

In the present embodiment, in order to facilitate access to the feedback screen from the smartphone 3 or the like, a business card size card 6 in which vehicle information of the driver and a URL for accessing a dedicated website are described is provided from the user to the driver. The URL is described on the card 6 in a code format, such as a QR code (registered trademark), that can be read by an electronic device.

Driver-Side Smartphone

The smartphone 3 is an example of an information processing terminal owned by the driver. The smartphone 3 is a general-purpose smartphone similarly to the smartphone 2, and includes a camera 30 and a display 31. The display 31 is configured as a touch panel display. Unlike the smartphone 2, it is not necessary to install the application 200 in the smartphone 3.

When the estimation processing for the tire T included in the vehicle that the driver is on is completed, the driver receives an explanation of the current state of the tire T and a proposal of a recommended countermeasure, while the feedback screen G3 displayed on the display 21 of the smartphone 2 is presented by the user. Then, the user receives the card 6 in which vehicle information of the driver is written from the user. Thereafter, when the driver checks the feedback screen G3 again, a code 60 is read by a bar-code reader application using the camera 30 of the smartphone 3 with reference to the card 6. As a result, the driver can access the dedicated website from the smartphone 3 without manually inputting the URL of the dedicated website. At this time, the front page of the dedicated website displayed on the display 31 is a form screen for inputting vehicle information. The driver operates the touch panel display 31 to input the vehicle information of the driver described in the card 6 into an input field in the form screen.

When the input vehicle information is transmitted to the server device 4 by an operation of the driver, the server device 4 collates the vehicle information with the vehicle information database and searches for matching vehicle information. The server device 4 transmits data of the feedback screen G3 associated with the vehicle information found by the collation to the smartphone 3. As a result, the feedback screen G3 is displayed on the display 31.

3. Configuration of Machine Learning Model

First Machine Learning Model

Figure 4:
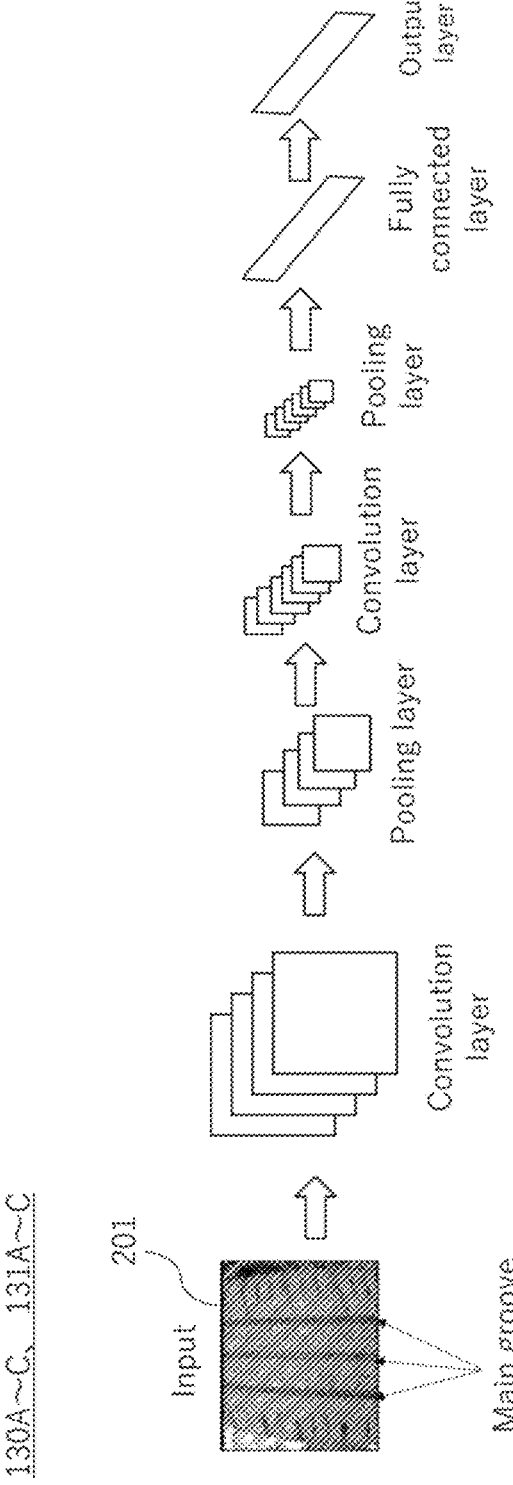
FIG. 4 is a diagram for illustration of an outline of a structure of a machine learning model according to the embodiment.

Next, a configuration of the first machine learning model 130 used in the estimation processing described later will be described with reference to FIG. 4. As described above, the first machine learning model 130 uses the image of the tire T as an input, and uses a value corresponding to the estimation result of the uneven wear of the tire T as an output. The input image of the tire T is an image taking a tread including both ends from the front of the tire T, more specifically, an image obtained such that the image includes both ends of a tread of a tire and the tread is continuous in a longitudinal direction of the image, and has a predetermined number of pixels of H×W. In the present embodiment, the estimation result of the uneven wear is an index indicating a degree of the uneven wear of the tire T in stages, and one of an uneven wear level 1, an uneven wear level 2, and an uneven wear level 3 is obtained in an ascending order of the degree of the uneven wear. The uneven wear level 1 indicates that there is no or little uneven wear. The uneven wear level 2 indicates that there is moderate uneven wear. The uneven wear level 3 indicates that there is severe uneven wear.

In the present embodiment, the first machine learning model 130 is a convolutional neural network (CNN), and is constructed for each type of tires (summer tires, winter tires, all-season tires). That is, the first machine learning model 130 is a generic term for three machine learning models of a first machine learning model 130A for summer tires, a first machine learning model 130B for winter tires, and a first machine learning model 130C for all-season tires. Each of the first machine learning models 130A to C is generated by learning using different data for learning, and parameters are optimized for each tire type. That is, layer configurations of the first machine learning models 130A to C are common as illustrated in FIG. 4, but parameters defining these models are different from each other. Therefore, the layer configuration of the first machine learning model 130A will be described below, and descriptions of the layer configurations of the first machine learning models 130B and C will be omitted.

The first machine learning model 130A includes alternately arranged convolution layers and pooling layers, a fully connected layer connected to an output side of these layers, and an output layer. The convolution layer and the pooling layer are layers for extracting features of the input image. In the first convolution layer, convolution processing is executed on the input image by a large number of weight filters having a size smaller than the input image. As a result, M feature maps as many as a number M of weight filters are generated (M is an integer of 2 or more and is appropriately determined). More specifically, the feature map is calculated by repeatedly calculating an inner product of the input image and each weight filter by raster scan, and convolving the weight filter into the input image. The weight filter is an array of values for detecting and emphasizing a certain pattern (feature) included in the input image. The feature map is an image (or an array of values) in which the features of the weight filter are emphasized in the input image in response to the features of the weight filter. The value of each weight filter is optimized by the learning processing described later.

Next, in a first pooling layer, pooling processing is performed on each of the feature maps, and as a result, M feature maps are generated. The pooling processing is processing of converting a previous feature map into a new feature map by outputting a response value representing a small area included in the previous feature map. With this pooling processing, a size of the previous feature map can be reduced. In addition, it is possible to reduce positional sensitivity and absorb positional deviation of the feature to be detected in the input image. More specifically, in the pooling processing, each feature map is divided into small areas, and one pixel value to be a response value is determined on the basis of a pixel value included in each small area. The method of determining the response value can be appropriately set, and may be an average value or a maximum value of the pixel values in the small area.

Each of the newly generated feature maps is further input to a second convolution layer. Here, N new weight filters are prepared (N is an integer of 2 or more and is appropriately determined), and the convolution processing is performed similarly to the first convolution layer. As a result, N feature maps are generated. Also, in the second convolution layer, a value of each weight filter is optimized by the learning processing described later.

Further, each of the N feature maps is input to a second pooling layer. In the second pooling layer, second pooling processing is executed, and the N feature maps are converted into new feature maps. The feature map (image) output from the second pooling layer is converted into a one-dimensional vector and input to the fully connected layer.

The fully connected layer is a multilayer perceptron, and classifies the tire T of the input image into any index of the uneven wear level 1, the uneven wear level 2, and the uneven wear level 3. The fully connected layer includes an input layer, an intermediate layer, and an output layer each having a plurality of units. The weight coefficient and bias for combining the units in each layer are optimized by the learning processing described later. Units of the output layer in the fully connected layer corresponds to three indicators (levels) indicating the degree of uneven wear.

The output layer applies a softmax function to three output values from the output layer of the fully connected layer, and outputs probability corresponding values in which the uneven wear of the tire T corresponds to the indexes of the uneven wear level 1, the uneven wear level 2, and the uneven wear level 3. The index corresponding to a unit having the highest probability corresponding value corresponds to the estimation result of the uneven wear of the tire T.

Second Machine Learning Model

As described above, the second machine learning model 131 receives the image of the tire T as an input, and outputs a remaining depth of a main groove of the tread of the tire T, in other words, a value corresponding to the estimation result of the wear amount of the tread. The input image of the tire T is the same as the image input to the first machine learning model 130. In the present embodiment, the estimation result of the wear amount of the tread is an index indicating the remaining depth of the main groove of the tread in stages, and is any one of a wear amount level 1, a wear amount level 2, and a wear amount level 3 in a descending order of the remaining depth of the main groove. The wear amount level 1 indicates that the depth of the main groove is sufficient and there is no or almost no wear. The wear amount level 2 indicates that the depth of the main groove is moderately reduced and there is moderate wear. The wear amount level 3 indicates that the depth of the main groove is considerably reduced, and there is severe wear.

The second machine learning model 131 of the present embodiment is also a convolutional neural network (CNN) similar to the first machine learning model 130, and is constructed for each type of tires (summer tires, winter tires, all-season tires). That is, the second machine learning model 131 is a generic term for three machine learning models of a second machine learning model 131A for summer tires, a second machine learning model 131B for winter tires, and a second machine learning model 131C for all-season tires. Each of the second machine learning models 131A to C is generated by learning using different data for learning, and parameters are optimized for each tire type. For this reason, layer configurations of the second machine learning models 131A to C are common, but parameters defining these models are different from each other. In the present embodiment, the layer configurations of the second machine learning models 131A to C are common to that of the first machine learning model 130 illustrated in FIG. 4. Therefore, the above description is also applied to the second machine learning models 131A to C, and description of the layer configurations of the second machine learning models 131A to C will be omitted.

Note that, in the present embodiment, the trained first machine learning models 130A to C and the trained second machine learning models 131A to C are generated by the learning unit 10E incorporated in the estimation device 1 as described later. However, a learning function of training the machine learning model and generating the trained first and second machine learning models 130 and 131 may be independent of a function of estimating the uneven wear and the depth of the main groove of the tire based on these trained models 130 and 131. In other words, only the estimation function may be implemented in the estimation device 1, and the trained first machine learning model 130 and the trained second machine learning model 131 trained by another computer may be loaded into the storage unit 13.

4. Operation of Estimation System

Figure 5A:
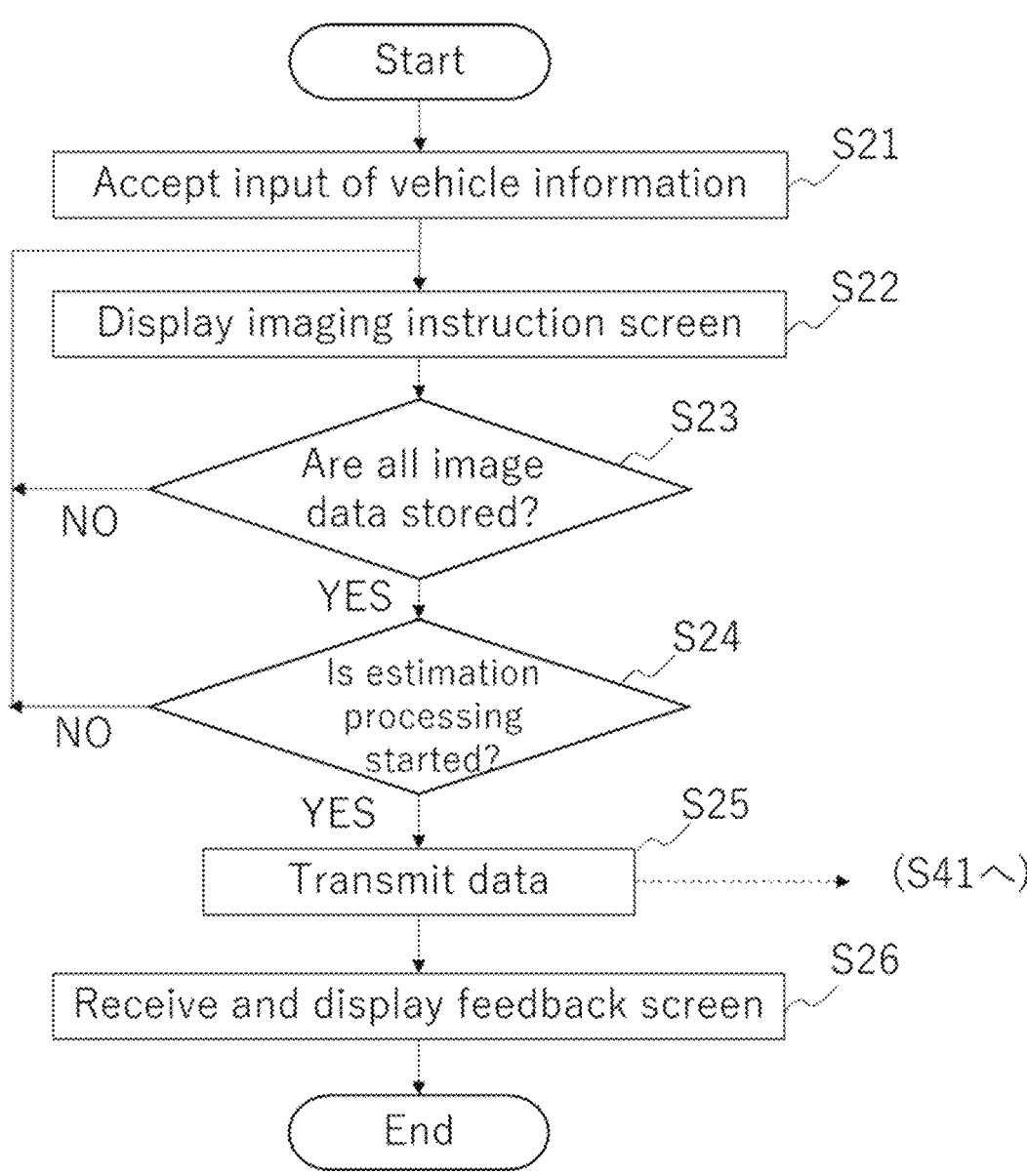
FIG. 5A is a flowchart showing a flow of processing performed by the information processing terminal on the user side in the estimation system.

Next, with reference to FIGS. 5 to 9, an operation of the estimation system 5 that estimates the uneven wear and the wear amount of the tire T will be described. The estimation processing of estimating the uneven wear and the wear amount of the tire T is executed by the estimation device 1. However, the estimation system 5 as a whole operates by cooperation of the estimation device 1, the smartphone 2, and the server device 4. Therefore, an operation of the estimation system 5 including the estimation processing by the estimation device 1 will be described below while appropriately referring to the user interface screen displayed on the smartphone 2 or the like. This operation starts, for example, when the user starts the application 200 of the smartphone 2. FIG. 5A is a flowchart showing a flow of processing performed by the smartphone 2, and FIG. 5B is a flowchart showing a flow of processing performed by the server device 4 and the estimation device 1.

Note that since the estimation processing is performed for all the tires attached to wheels (hubs) of a normal vehicle, a case where the vehicle is a four-wheeled vehicle will be described below as an example. It is assumed that the vehicle is lifted up in a state in which the tire T is attached to each of the wheels.

Reference is made to FIG. 5A. At the time of start, a start screen is displayed on the display 21 by the application 200. On the start screen, for example, an input field for inputting the vehicle information and a graphic of a fix button to fix the input are displayed. The user operates the touch panel display 21 to input the vehicle information in the input field. Subsequently, when the user taps the graphic of the fix button, the application 200 accepts the input of the vehicle information and stores the vehicle information in the storage unit 23 (step S21).

Figure 6:
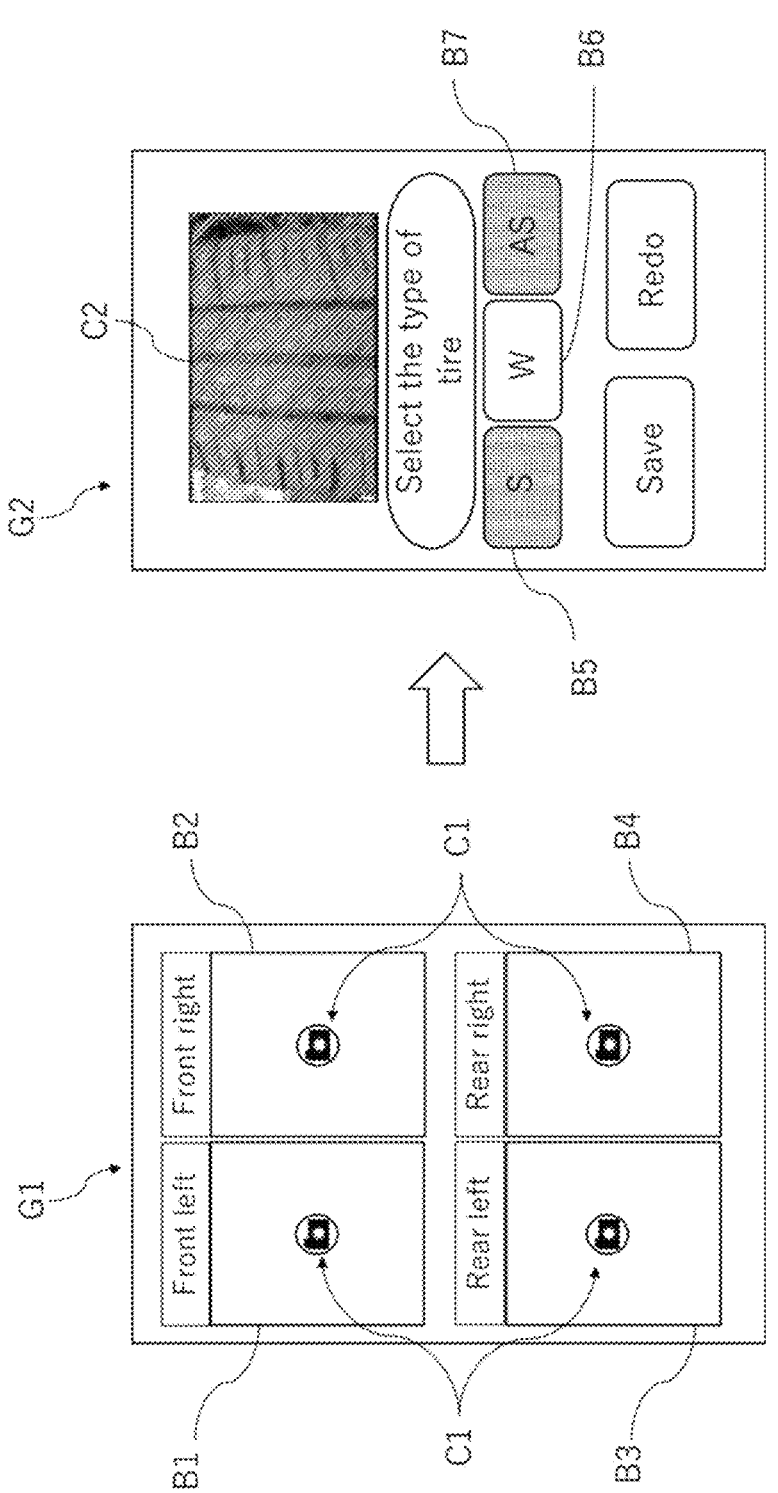
FIG. 6 shows an example of a user interface screen displayed on the information processing terminal on the user side.

Subsequently, the application 200 displays, on the display 21, an imaging instruction screen G1 that prompts the user to take the image of the tire T mounted on each wheel (step S22). For example, as illustrated in FIG. 6, the imaging instruction screen G1 displays four boxes B1 to B4 corresponding to a front left wheel, a front right wheel, a rear left wheel, and a rear right wheel of the vehicle in association with positional relationship of the wheels of the vehicle. For example, a position of the wheel is displayed above each box, and a camera icon C1 is displayed in each box. More specifically, "front left" is displayed above the box B1, "front right" is displayed above the box B2, "rear left" is displayed above the box B3, and "rear right" is displayed above the box B4. The positional relationship among the boxes B1 to B4 on the imaging instruction screen G1 corresponds to the positional relationship among the wheels of the vehicle.

The user first selects one of the boxes in the imaging instruction screen G1. This selection is performed, for example, by tapping the camera icon C1 displayed in the box. When the camera icon C1 is tapped by the user, the application 200 activates the camera 20. At this time, the imaging instruction screen G1 is temporarily switched to a monitor screen G2 of the camera 20. The monitor screen G2 includes a camera frame C2. The camera frame C2 is a frame having a pixel number of H×W pixels which is the same number as that of the image input to the first and second machine learning models 130 and 131, and is configured such that image data of the subject of the camera frame C2 is generated.

The user takes a position at a side of the tire T attached to a position corresponding to the selected box, and takes an image of the tire T such that both ends of the tread of the tire T is included within the camera frame C2. The user views the obtained image on the monitor screen G2 and confirms whether or not the image is appropriate as data to be used for the estimation processing. This confirmation is performed, for example, as to whether the main groove of the tread including both ends of the tread is clearly obtained, whether the tread is obtained from the front, whether the tread is continuous in the vertical direction (longitudinal direction) of the image (whether the ground surface of the tire T is not shown), whether the tread is in focus, whether there is no other reflection that interferes with the image of the tire T, and the like.

As a result of the confirmation, if it is determined that the image is appropriate, the user taps an appropriate selection box from among selection boxes B5 to B7 for selecting a type of the tire T displayed on the monitor screen G2 to bring the selected box into a selected state. The selection boxes B5 to B7 are displayed for three types of tires, for example, summer tires, winter tires, and all-season tires. The user visually confirms the tire T or determines whether the tire T is a summer tire, a winter tire, or an all-season tire by hearing from the driver, and taps any of the selection boxes B5 to B7 corresponding to the tire T. As a result, the tapped selection box is brought into a selected state. For example, the application 200 displays the selected selection box brightly, and grays out the other selection boxes.

Subsequently, the user taps a graphic of a "save" button displayed on the monitor screen G2, and fixes the obtained image. As a result, the image data 201 of the tire T associated with the selected type of the tire T is generated by the application 200 and stored in the storage unit 23 of the smartphone 2. On the other hand, if it is determined that the image is inappropriate, the user taps, for example, a graphic of a "redo" button displayed on the monitor screen G2 to take an image by the camera 20 again. The user can take an image any number of times until the image data 201 of the tire T corresponding to the selected boxes B1 to B4 is stored.

Figure 7:
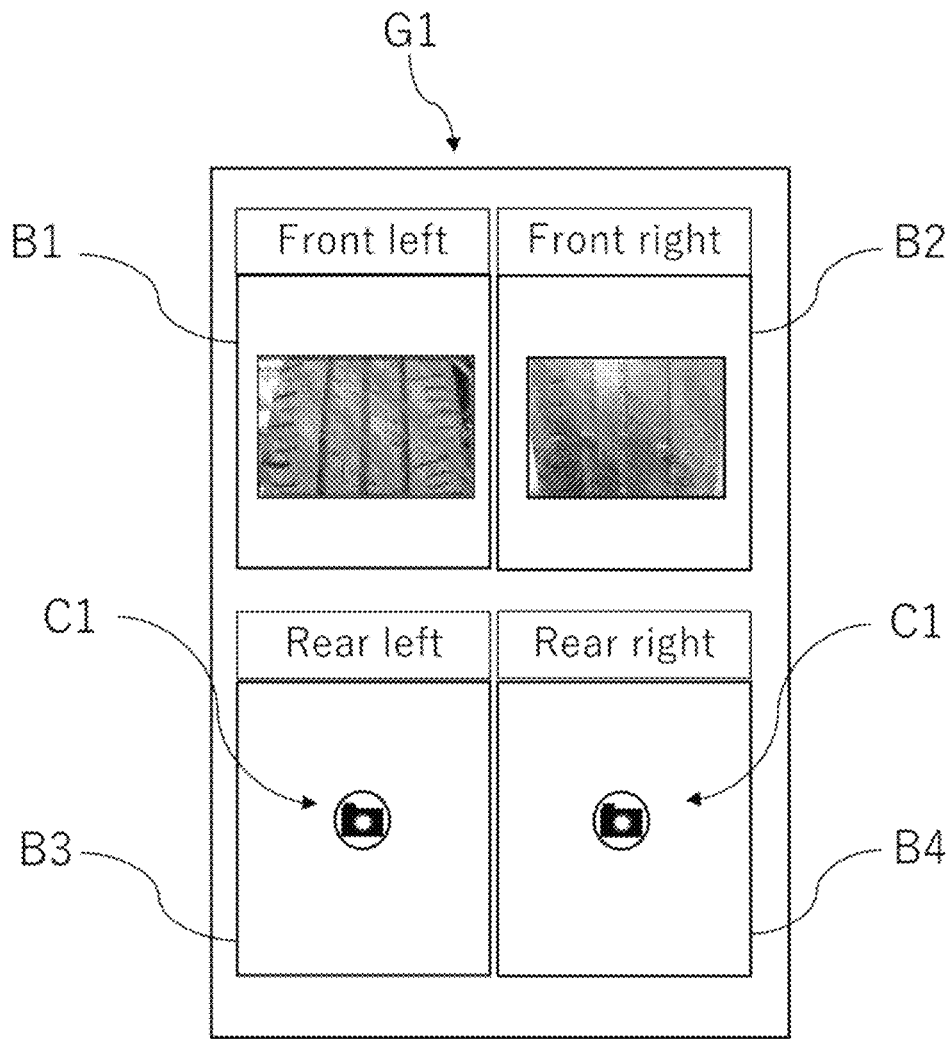
FIG. 7 shows another example of a user interface screen displayed on the information processing terminal on the user side.

When the image data 201 of the tire T is stored in the storage unit 23, the application 200 displays the imaging instruction screen G1 on the display 21 again. However, as illustrated in FIG. 7, on the imaging instruction screen G1 to be displayed next, a thumbnail image of the image data 201 stored in the storage unit 23 is displayed in the box corresponding to the wheel for which the user has already obtained an image and has fixed the image. As a result, the user can grasp the wheel on which the image data 201 is not yet stored. The user selects a box on which no thumbnail is displayed by viewing the imaging instruction screen G1, and takes an image of the tire T corresponding to the selected box in the same procedure as described above. By repeating the above procedure for each wheel, four pieces of the image data 201 including the treads of the four tires T are generated and stored in the storage unit 23. The four pieces of the image data 201 are generated for the boxes B1 to B4, and are automatically associated with the positions of the wheels and stored in the storage unit 23.

Referring to FIG. 5A again, every time the image data 201 is stored in the storage unit 23, the application 200 determines whether the image data 201 of the tire T has been stored for all of the wheels of the vehicle (step S23). When it is determined that the image data 201 of the tire T has been stored for all of the wheels, that is, when it is determined that four pieces of the image data 201 of the tire T have been prepared (YES), the application 200 displays a start confirmation screen described later on the display 21 (step S24). When it is determined that the image data 201 of the tire T is not stored for all of the wheels, that is, when it is determined that the number of the pieces of the image data 201 of the tire T is less than four (NO), the application 200 displays the imaging instruction screen G1 again as described above to prompt the user to obtain images of the remaining tires T.

The start confirmation screen displayed on the display 21 in step S24 is a screen for confirming the user whether to start the estimation processing based on the first machine learning model 130 and the second machine learning model 131 by using the four pieces of the image data 201 determined to be prepared in step S23. The start confirmation screen can include a message asking the user to start the estimation processing, for example, "Start AI diagnosis?", a graphic of a "start" button, and a graphic of a "return" button. When the user taps the graphic of the "start" button (YES), the application 200 transmits the four pieces of the image data 201 saved in step S22, the type of the tire T, and the vehicle information saved in step S21 to the server device 4 (step S25).

In a case where the user desires to correct the image data 201 saved in step S22, the user can tap the graphic of the "return" button in step S24 (NO). In this case, the application 200 may be configured to display the imaging instruction screen G1 again. The user selects a box of the wheel for which the image data 201 is to be corrected, for example, by viewing the thumbnail displayed on the imaging instruction screen G1. The application 200 may be configured to accept this operation, activate the camera 20 again, and display the monitor screen G2.

When the image data 201, the vehicle information, and the type of the tire T are normally transmitted to the server device 4 in step S25, the application 200 moves to a standby mode to receive the data of the feedback screen G3 generated by the estimation device 1 from the server device 4. Then, the processing illustrated in FIG. 5B starts.

Upon receiving the image data 201, the vehicle information, and the type of the tire T from the smartphone 2 in step S25, the server device 4 registers the received vehicle information and the type of the tire T in its own vehicle information database (step S41). In addition, the server device 4 transmits a command for performing the estimation processing and requesting transmission of the data of the feedback screen G3 to the estimation device 1, together with the image data 201, the vehicle information, and the type of the tire T (step S42).

The estimation device 1 receives the image data 201, the vehicle information, the type of the tire T, and the request for the feedback screen G3 transmitted by the server device 4 in step S42, and starts the estimation processing for the uneven wear and the wear amount of the tire T (step S11). In step S11, the image acquisition unit 10A reads (acquires) the received image data 201.

In subsequent step S12, the derivation unit 10B selects an appropriate model from the first machine learning models 130A to C and the second machine learning models 131A to C for each tire T on the basis of the received type of the tire T. For example, when the tire T is a summer tire, the derivation unit 10B selects the first machine learning model 130A and the second machine learning model 131A. Since this selection is performed for each tire T, the machine learning model to be selected may be different even the tires are of the same vehicle.

In subsequent step S13, the derivation unit 10B inputs the image data 201 of the tire T to the first machine learning model 130 selected in step S12, and inputs the image data 201 of the same tire T to the second machine learning model 131 selected in step S12. In a case where a plurality of machine learning models is selected in step S12, the image data 201 of the appropriate tire T is input to all of the selected machine learning models.

In subsequent step S14, the derivation unit 10B derives an output for each piece of the image data 201 from the first machine learning model 130, and stores the output in the storage unit 23. As described above, the output from the first machine learning model 130 is a probability corresponding value corresponding to the three indexes indicating the degree of uneven wear. Similarly, the derivation unit 10B derives an output for each piece of the image data 201 from the second machine learning model 131 and stores the output in the storage unit 23. The output from the second machine learning model 131 is a probability corresponding value corresponding to three indexes indicating the wear amount or the remaining depth of the main groove of the tread.

In subsequent step S15, the determination unit 10C determines an index indicating the degree of the uneven wear of the tire T and an index indicating the wear amount of each piece of the image data 201 on the basis of the outputs of the first machine learning model 130 and the second machine learning model 131 derived in step S14. The determination unit 10C sets an index having the largest probability corresponding value among the outputs from the first machine learning model 130 as the estimation result of the uneven wear. Similarly, the determination unit 10C sets an index having the largest probability corresponding value among the outputs from the second machine learning model 131 as the estimation result of the wear amount. Then, the determination unit 10C reads the determination table 134 from the storage unit 13, and searches a cell matching the estimation result of the uneven wear and the estimation result of the wear amount. As illustrated in FIG. 8, the determination table 134 in the present embodiment is a table having 3×3 cells in which the uneven wear level is a row and the wear amount level is a column, and each cell has data of A1 to A3 indicating the determination where the cell is matched. A1 means that it is determined that there is no problem in both the uneven wear and the wear amount, and that there is no need to take measures at present. A2 means that it is determined that at least one of the uneven wear and the wear amount is moderate, and that tire rotation is recommended as a countermeasure. A3 means that it is determined that at least one of the uneven wear and the wear amount is severe, and that it is recommended to replace the tire T as a countermeasure.

For example, it is assumed that for one piece of the image data 201, the estimation result of the uneven wear based on the output from the first machine learning model 130 is the uneven wear level 2, and the estimation result of the wear amount based on the output from the second machine learning model 131 is the wear amount level 1. In the determination table 134, data of the corresponding cell is "A2", and in this case, tire rotation is recommended. In addition, for example, it is assumed that the estimation result of the uneven wear based on the output from the first machine learning model 130 is the uneven wear level 3, and the estimation result of the wear amount based on the output from the second machine learning model 131 is the wear amount level 1. In the determination table 134, data of corresponding cell is "A3", and in this case, it is recommended to replace the tire T. As described above, according to the determination according to the determination table 134, the estimation result of the uneven wear and the estimation result of the wear amount are comprehensively considered, and if one is level 1 and the other is level 2 or above, it is determined that the countermeasure according to the larger degree is recommended. As a result, even in a case where it can be considered that there is no problem by estimating only one of the uneven wear and the wear amount, it is possible to recommend a countermeasure at an early stage, and appropriate maintenance management of the tire T is achieved.

Figure 9A:
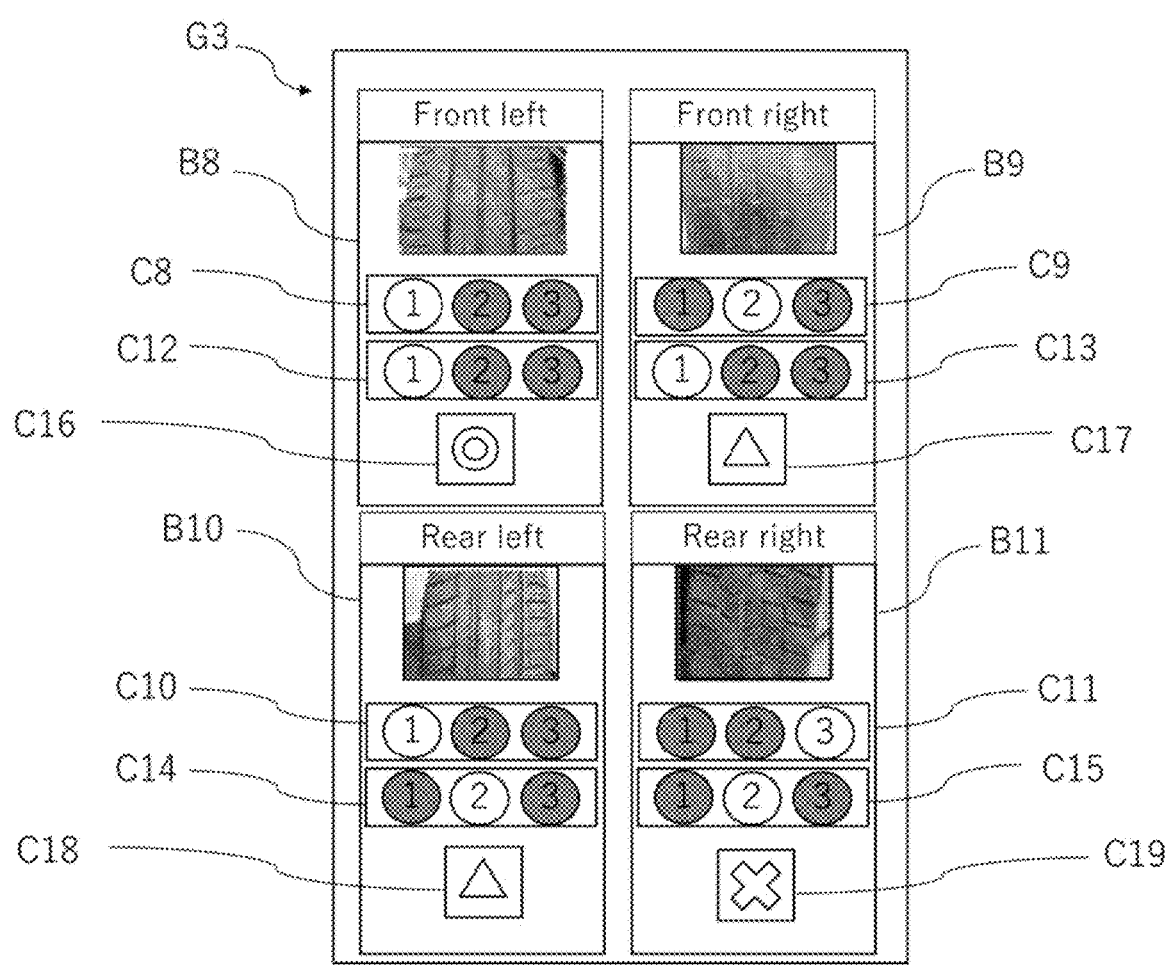
FIG. 9A shows an example of a feedback screen generated by the estimation device.

In subsequent step S16, the screen generation unit 10D generates the feedback screen G3 on the basis of the indexes and the determination determined in step S15. For example, as illustrated in FIG. 9A, the feedback screen G3 includes four boxes B8 to B11, thumbnails of the image data 201 displayed in the boxes B8 to B11, and graphics C8 to C18. Similarly to the imaging instruction screen G1, the boxes B8 to B11 are displayed in a positional relationship corresponding to the front left wheel, the front right wheel, the rear left wheel, and the rear right wheel of the vehicle. The thumbnail of the image data 201 of the tire T is displayed in each of the boxes B8 to B11 corresponding to the wheel with which the image data 201 is associated.

The graphics C8 to C11 include figures in which any of the numbers 1-3 is displayed and arranged in order. Each figure represents an estimated uneven wear level of 1-3 corresponding to the output derived from the first machine learning model 130. For each tire T displayed in the boxes B8 to B11, the screen generation unit 10D displays the figure corresponding to the number of the uneven wear level determined in step S15 brightly, and grays out the figures corresponding to the other numbers, thereby displaying the level of the uneven wear in a visually recognizable manner. Similarly, the graphics C12 to C15 include figures in which any of the numbers 1-3 is displayed and arranged in order. Each figure represents an estimated wear amount level of 1-3 corresponding to the output derived from the second machine learning model 131. For each tire T displayed in the boxes B8 to B11, the screen generation unit 10D displays the figure corresponding to the number of the wear amount level determined in step S14 brightly, and grays out the figures corresponding to the other numbers, thereby displaying the level of the wear amount in a visually recognizable manner. As described above, on the feedback screen G3, as the degree of the uneven wear and the wear, the index indicating the degree of the uneven wear and the wear in stages is displayed together with positioning of the index with respect to entire indexes. As a result, the user and the driver who confirm the feedback screen G3 can intuitively understand a degree of progress of the uneven wear and the wear.

Graphics C16 to C19 indicate determination results based on the determination table 134, and can include different graphics according to determination results A1 to A3. For example, the graphic C16 includes a double circle figure and corresponds to the determination result A1. The graphics C17 and C18 include a triangle figure and correspond to the determination result A2. The graphic C19 includes a cross figure and corresponds to the determination result A3. That is, the graphics C16 to C19 are graphics that indicate the determination result as to whether or not a countermeasure is necessary for each tire T and a recommended countermeasure. On the side of the graphics C16 to C19, for example, a message indicating the determination result as to whether a specific countermeasure is necessary or a recommended countermeasure, such as "no action is necessary", "tire rotation is necessary", or "tire replacement is necessary", may be shown.

The feedback screen G3 of the present embodiment is an example of the determination result display screen and an uneven wear estimation result display screen. On the feedback screen G3 exemplified in FIG. 9A, all of the uneven wear estimation result, the wear amount estimation result, and the determination result are displayed, but any of these may be omitted. In addition, the determination result display screen and the uneven wear estimation result display screen may be generated as, instead of the same screen data, data of a plurality of screens for respective tires or for respective estimation results or determination results.

In a case where a tire for which rotation is recommended is included in the determination based on the determination table 134 in step S15, the determination unit 10C may further determine a recommended tire rotation pattern (hereinafter, also referred to as "recommended pattern") according to the determination based on the determination table 134. The recommended pattern may be determined by, for example, incorporating the determination based on the determination table 134 and an algorithm for determining a recommended pattern based on position information of the wheel into the program 132 in advance, and executing the algorithm in step S15. In addition, the determination unit 10C may determine a generally recommended rotation pattern as the recommended pattern without particularly based on the algorithm or the like that determines the recommended pattern.

Figure 9B:
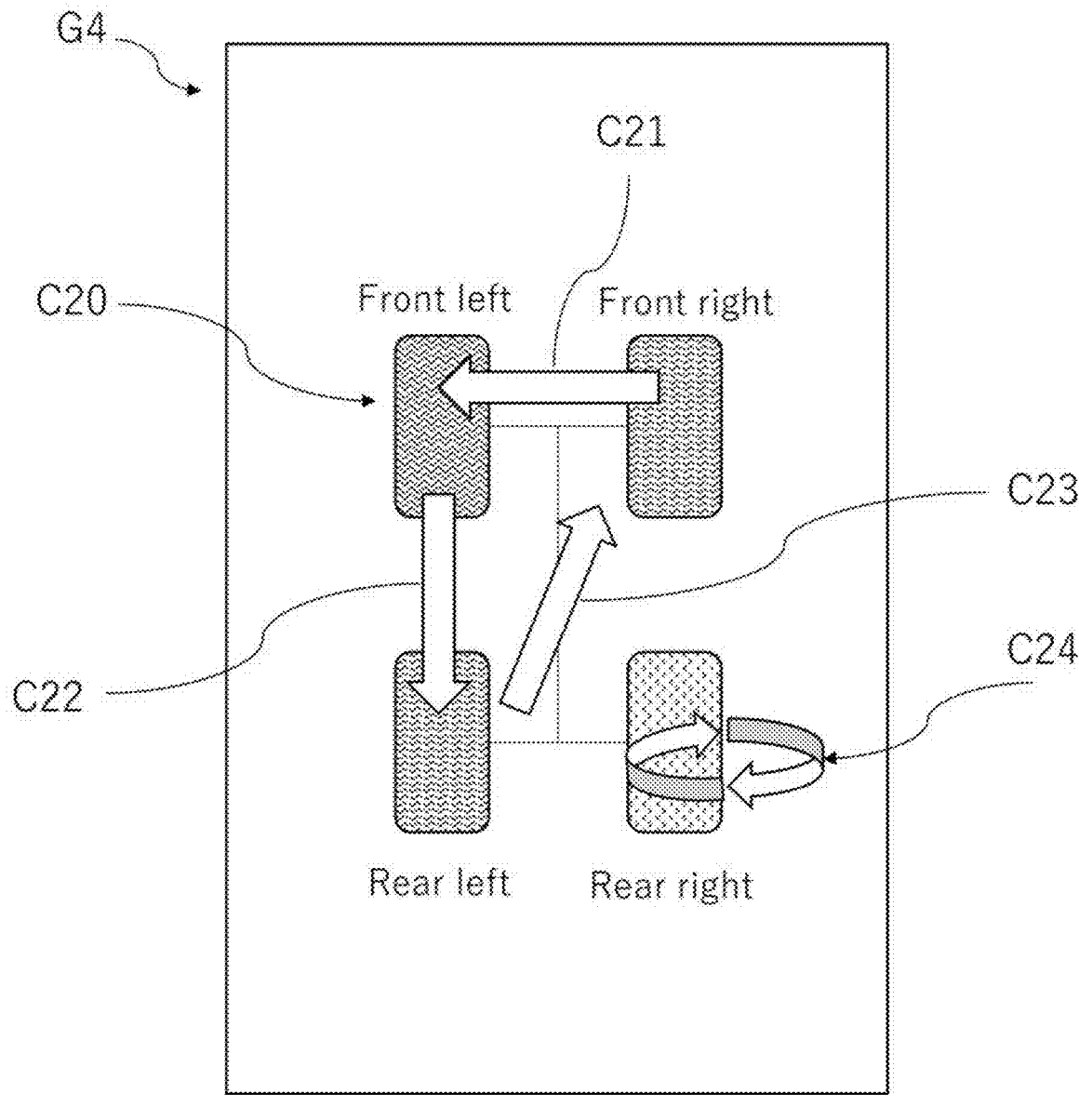
FIG. 9B shows an example of a rotation screen generated by the estimation device.

In step 516, the screen generation unit 10D may further generate data of a rotation screen G4 indicating the recommended pattern in addition to the data of the feedback screen G3. FIG. 9B illustrates an example of the rotation screen G4. The rotation screen G4 includes, for example, a graphic C20 of a vehicle in which the tire T is mounted on each of its wheels, graphics C21 to C23 indicating recommended patterns, and a graphic C24 indicating replacement. The graphics C21 to C23 are arrow figures, for example, and indicate that a position of the wheel indicated by a tip of an arrow is recommended as a position at which the tire T at a base of the arrow is to be attached. In addition, the graphic C24 is a figure of an arrow that circulates, for example, and displaying this figure over or by the graphic of the tire T indicates that this tire T is recommended to be replaced. In addition, the graphics of the tires T may change in pattern, color, and the like, for example, according to the determination result based on the determination table 134.

Referring again to FIG. 5B, the screen generation unit 10D transmits the generated data of the feedback screen G3 to the server device 4 (step S17). In addition, in a case where the data of the rotation screen G4 is generated, the screen generation unit 10D similarly transmits the data. As a result, in the estimation device 1, the estimation processing of the state of the tire for one set of the image data 201 ends.

The server device 4 receives the data of the feedback screen G3 transmitted from the estimation device 1, and stores the data in its own storage device in association with the vehicle information database (step S43). The server device 4 assigns a unique URL to the data of the feedback screen G3 as the web data 7. Then, the server device 4 transmits the data of the feedback screen G3 to the smartphone 2 (step S44). Here, in a case where the data of the rotation screen G4 is transmitted, processing similar to that of the data of the feedback screen G3 is also performed, and the data of the rotation screen G4 is made accessible via the network. As a result, in the server device 4, the processing to the one set of the image data 201 ends.

Referring to FIG. 5A again, the smartphone 2 receives the data of the feedback screen G3 transmitted by the server device 4 in step S44. The application 200 displays the feedback screen G3 on the display 21 (step S26).

While presenting the feedback screen G3 displayed on the display 21 to the driver, the user will explain the state of uneven wear and the state of wear amount estimated for the four tires, as well as a recommended countermeasure. Hereinafter, a case where the feedback screen G3 is the screen illustrated in FIG. 9A will be described as an example. For the front left wheel (front left), the user can explain that both the uneven wear level and the wear amount level are estimated to be "1" while showing the graphics C8 and C12, and then explain that it is considered that there is no problem in the current situation (it is determined that no countermeasure is required) while showing the graphic C16. For the front right wheel (front right), the user can explain, while showing the graphics C9 and C13, that the uneven wear level is estimated to be "2", but the wear amount level is estimated to be "1", and then explain, while showing the graphic C17, that the tire rotation is recommended in order to suppress further progress of the uneven wear. For the left rear wheel (rear left), the user can explain that the uneven wear level is estimated to be "1" but the wear amount level is estimated to be "2" while showing the graphics C10 and C14, and then explain that the tire rotation is recommended for smoothing of the wear amount while showing the graphic C18. For the right rear wheel (rear right), the user can explain, while showing the graphics C11 and C15, that the uneven wear level is estimated to be "3" and the wear amount level is estimated to be "2", and subsequently explain, while showing the graphic C19, that even though the wear amount appears to be medium, the uneven wear is severe, and therefore it is recommended to replace the tire.

According to the feedback screen G3 as described above, the images of the four wheels are listed as thumbnails, and the estimated uneven wear level and wear amount level are displayed in a graphic form together with the positioning in the entire stages. As a result, the driver who has received the explanation from the user can grasp the situation estimated for the tire T of the own vehicle with a sense of satisfaction even without the driver inspecting the four tires T by himself/herself. In addition, according to the feedback screen G3, one of the three types of graphics is displayed in accordance with the recommended countermeasure according to the larger one of the uneven wear and the wear amount. This allows the driver to contemplate tire rotation or tire replacement at an early stage. For example, the driver presented with the feedback screen G3 as shown in FIG. 9A can consider rotation of changing the wheel positions of at least the tire T of the right front wheel and the tire T of the left rear wheel, or at least changing the tire T of the right rear wheel. In particular, the level of the uneven wear tends to be difficult to grasp for a general driver who does not have much knowledge about tires. Compared with the wear amount of the tread, the skill and difficulty required for the discovery of the uneven wear are high, and the tread with the uneven wear is likely to be left for a long period of time without being noticed by the driver. According to the present embodiment, it is possible to prompt such a use for replacement or rotation.

Furthermore, in a case where the smartphone 2 also receives the data of the rotation screen G4 in step S26, the application 200 can switch the feedback screen G3 to the rotation screen G4 in accordance with the operation of the user and display the same on the display 21. The user can easily recognize the recommended pattern by checking the rotation screen G4. In addition, the recommended pattern can be explained to the driver while presenting the rotation screen G4, and more persuasive explanation can be presented to the driver.

5. Flow of Learning Processing

Figure 10:
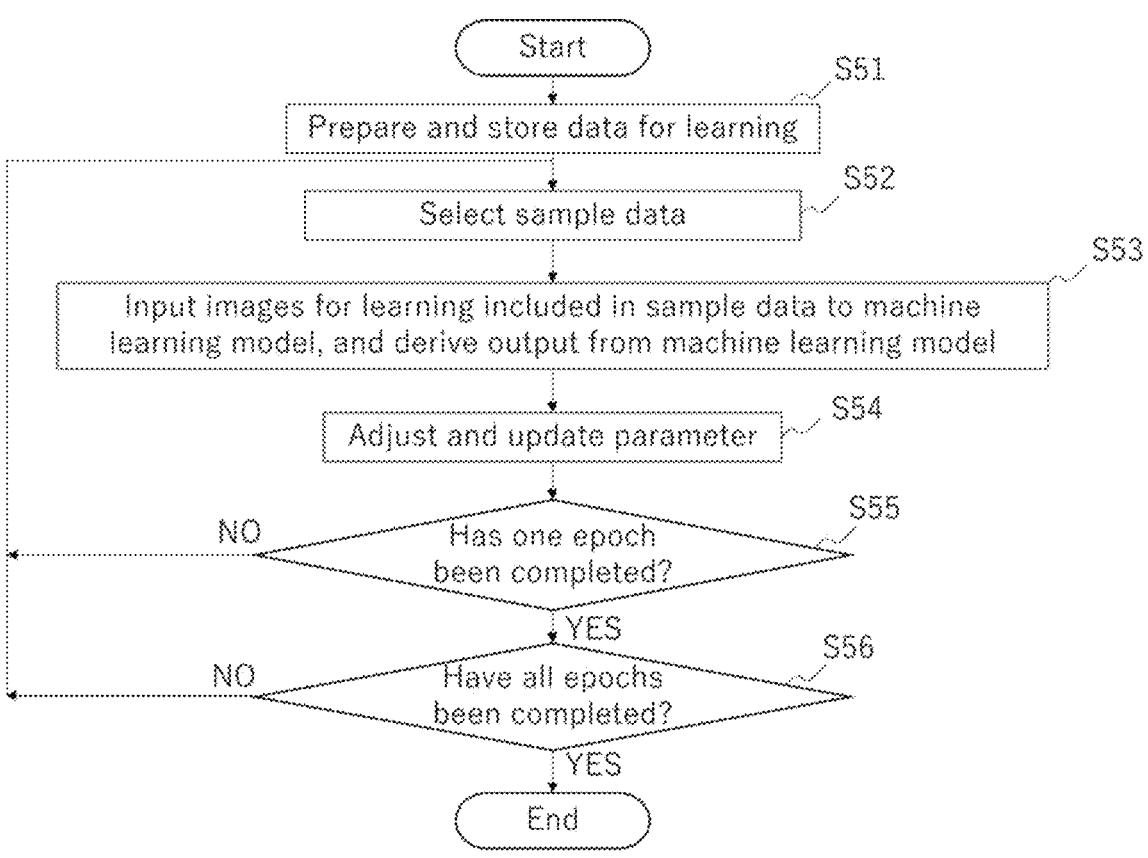
FIG. 10 is a flowchart showing a flow of learning processing.

Hereinafter, a method for generating the first machine learning model 130 and the second machine learning model 131 that have been trained, that is, a learning method of the first and second machine learning models executed by the learning unit 10E will be described with reference to FIG. 10.

Learning of First Machine Learning Model

As described above, the first machine learning models 130A to C of the present embodiment are generated for each type of the tire T. Therefore, the data for learning of the first machine learning models 130A to C is also prepared for each type of the tire T. In the present embodiment, data for learning of the first machine learning model 130A is a large number of data sets in which an image for learning including a tread of a summer tire and correct answer data are combined, data for learning of the first machine learning model 130B is a large number of data sets in which an image for learning including a tread of a winter tire and correct answer data are combined, and data for learning of the first machine learning model 130C is a large number of data sets in which an image for learning including a tread of an all-season tire and the correct answer data are combined. In any of these data for learning, the correct answer data is a label of an index indicating a degree of the uneven wear. That is, the correct answer data is a label of one of the uneven wear level 1, the uneven wear level 2, and the uneven wear level 3. In the present embodiment, the image for learning and these labels are combined by a person who has confirmed the actual tire in the image for learning.

Hereinafter, the learning processing for generating the trained first machine learning model 130A will be described, but the trained first machine learning models 130B and 130C are also generated by similar learning processing. Therefore, description of the learning processing of the first machine learning models 130B and 130C will be omitted.

In step S51, as described above, the data for learning including a large number of data sets in which the image for learning including the tread of the tire and the correct answer data are combined is prepared and stored in the storage unit 13 by the learning unit 10E of the estimation device 1. The image for learning is an image obtained by taking an image of the tread from the front such that both ends of the tread are included and the tread is continuous in the longitudinal direction. The learning unit 10E stores the data for learning separately in advance into training data and test data. The ratio between the two can be appropriately set.

In subsequent step S52, the learning unit 10E randomly selects K data sets as sample data from the training data. K is a value also referred to as batch size, and can be appropriately set.

In subsequent step S53, the learning unit 10E inputs K images for learning included in the sample data to the first machine learning model 130A and derives an output from the first machine learning model 130A. The output is data corresponding to the correct answer data combined with each of the input K images for learning, and in the present embodiment, is a probability corresponding value corresponding to a label of the uneven wear level 1, the uneven wear level 2, or the uneven wear level 3.

In subsequent step S54, the learning unit 10E adjusts a parameter so that a value of an error function between the output derived in step S53 and the correct answer data combined with the image for learning input in step S53 is minimized. More specifically, the learning unit 10E adjusts and updates the weight coefficient and the bias in the fully connected layer of the first machine learning model 130A and the value of the weight filter in the convolution layer by backpropagation.

In subsequent step S55, the learning unit 10E determines whether or not learning of one epoch has been completed. In the present embodiment, when the processing from step S52 to step S55 is performed on the same number of pieces of the sample data as the number of pieces of the training data, it is determined that learning of one epoch has been completed. In a case where it is determined that the learning of one epoch is not completed, the learning unit 10E returns to step S52 after step S55. That is, the learning unit 10E selects sample data at random again, and repeats the procedure from step S53 to step S55 using the newly selected sample data. On the other hand, in a case where it is determined that learning of one epoch has been completed, it is determined whether or not learning of all epochs have been completed in step S56.

When it is determined that the learning of all the epochs have not been completed in step S56, the learning unit 10E executes step S52 again to perform the learning of the next epoch. The total number of epochs is not particularly limited, and can be appropriately set. When it is determined that the learning of all the epochs has completed in step S56, the learning unit 10E ends the learning of the first machine learning model 130A. The learning unit 10E stores the latest parameter of the first machine learning model 130A in the storage unit 13 as the trained first machine learning model 130A. That is, the trained first machine learning model 130A is generated by the above procedure.

Note that the learning unit 10E may input the test data to the first machine learning model 130A every time the learning for one epoch ends, calculate an error between the output and the correct answer data of the test data, and display the calculation result on the display unit 11. Furthermore, in a case where it is considered that the error of the output of the first machine learning model 130A has converged within a predetermined range before the learning of all epochs ends, the learning may end at this time.

Learning of Second Machine Learning Model

The learning unit 10E performs the above learning processing for the first machine learning models 130A to C and also performs similar learning processing for the second machine learning models 131A to C. That is, the processing of steps S51 to S56 described above also corresponds to the learning processing of the second machine learning models 131A to C. Therefore, details of the learning processing of the second machine learning models 131A to C will be omitted, and data for learning of the second machine learning models 131A to C will be described below.

The second machine learning models 131A to C of the present embodiment are generated for each type of the tire T. Therefore, the data for learning of the second machine learning models 131A to C is also prepared for each type of the tire T. In the present embodiment, the data for learning of the second machine learning model 131A is a large number of data sets in which an image for learning including the tread of the summer tire and correct answer data are combined, the data for learning of the second machine learning model 131B is a large number of data sets in which an image for learning including the tread of the winter tire and correct answer data are combined, and the data for learning of the second machine learning model 131C is a large number of data sets in which an image for learning including the tread of the all-season tire and correct answer data are combined. In any of the data sets, the image for learning is an image obtained by taking an image of the tread from the front such that both ends of the tread of the tire are included and the tread is continuous in the longitudinal direction. In any of these data for learning, the correct answer data is a label of an index indicating a degree of the wear amount. That is, the correct answer data is a label of one of the wear amount level 1, the wear amount level 2, and the wear amount level 3. Note that the image for learning may be data common to the image for learning of the first machine learning model 130.

In the present embodiment, the wear amount level corresponding to the remaining depth of the main groove of the tread is determined for each type of the tire T. An appropriate wear amount level is selected according to the depth of the main groove measured in the actual tire in the image for learning, and a label indicating the wear amount level is combined with the image for learning. In the present embodiment, a person checks an actual tire, selects a portion of a main groove that is worn most (shallower), and measures the depth of the groove at this portion.

6. Features

According to the estimation system 5 described above, since the uneven wear and the wear amount of the tire T are estimated by the trained machine learning model, variations in determination by a person are reduced, and the tire inspection service of the user is supported. In addition, in the algorithm for determining the necessity of the countermeasure and the type of the countermeasure, one of the estimated degree of the uneven wear and the estimated degree of the wear amount that is severer is weighted, so that a more appropriate countermeasure is recommended, and tire rotation or tire replacement can be performed at an early stage. Furthermore, by generating the data of the feedback screen G3 and the rotation screen G4, the user can present them, explain and propose the service to the driver more effectively, and prompt the driver to manage the tire T appropriately. Since the driver can check the feedback screen G3 and the rotation screen G4 at any timing by the card 6 provided from the user, it is possible to present the feedback screen G3 and the rotation screen G4 to the user at a later date and receive provision of a necessary service.

7. Modifications

Although one embodiment of the present invention has been described above, the present invention is not limited to the above embodiment, and various modifications can be made without departing from the gist thereof. Points of the gist of the following modifications can be appropriately combined.

(1)

In the above embodiment, the CNN model is used as the first and second machine learning models 130 and 131, but the machine learning model is not limited thereto, and another machine learning model such as a support vector machine (SVM), a neural network (NN) model, a K-NN model, clustering, k-means, a decision tree, or the like, or a model obtained by combining these may be used. In addition, the data for learning of the second machine learning model 131 may be a data set in which the image for learning and the depth of the main groove as the correct answer data are combined. That is, the output of the second machine learning model 131 may be an estimation value of the remaining depth of the main groove of the tire of the input image. In addition, the learning method of the first and second machine learning models 130 and 131 is not limited to the above embodiment, and a known parameter optimization algorithm such as stochastic gradient descent can be applied. In addition, a loss function is not limited to the above embodiment, and can be appropriately changed according to the property of the output data. In addition, in the image including the tread of the tire input to the first and second machine learning models 130 and 131 and the image for learning for training these machine learning models, the tread may not be continuous in the longitudinal direction, but the tread may be continuous in the lateral direction, or the tread may be continuous in another direction.

(2)

In the above embodiment, the uneven wear and the wear amount are estimated together as the state of the tire T. However, only the uneven wear may be estimated, and a recommended countermeasure may be determined based on the estimation result.

(3)

Figure 11A:
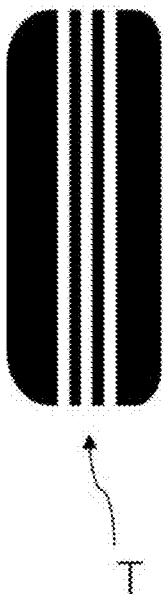
FIG. 11A is a view for illustration of an aspect of uneven wear.
Figure 11B:
FIG. 11B is a view for illustration of an aspect of uneven wear.
Figure 11C:
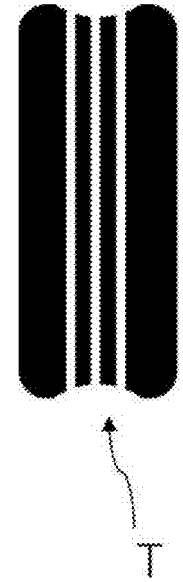
FIG. 11C is a view for illustration of an aspect of uneven wear.
Figure 11D:
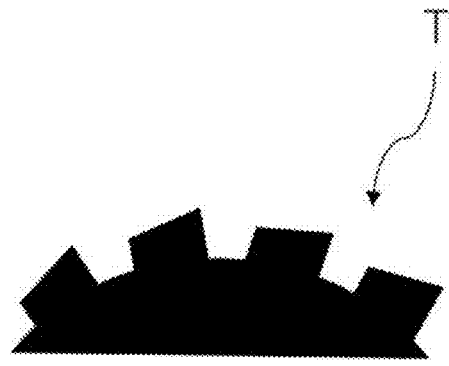
FIG. 11D is a view for illustration of an aspect of uneven wear.

In the above embodiment, the degree of uneven wear is estimated as the estimation of the uneven wear, but in addition to or instead of this, a type of the uneven wear may be estimated. The type of the uneven wear is, for example, a pattern illustrated in FIGS. 11A to 11D. FIG. 11A illustrates "one-side wear" in which one side of the tread is intensively worn in the width direction of the tire T (the direction in which the rotation axis of the tire T extends). The "one-side wear" is further subdivided into "inner wear" and "outer wear", depending on which of the left and right sides of the vehicle the tire T is attached to. FIG. 11B illustrates "both-side wear" in which both sides of the tread are intensively worn in the width direction of the tire T. FIG. 11C illustrates "center wear" in which the center of the tread is intensively worn in the width direction of the tire T. FIG. 11D illustrates "heel-toe wear" in which each block of the tread is worn in one direction and has a sawtooth shape when the tire T is viewed from the circumferential direction. The estimation of the types of the uneven wear can be made, for example, by mounting a trained machine learning model in the estimation device 1, in which an input is a tire image, and an output includes classifications of patterns of the uneven wear and no uneven wear. The structure of the machine learning model is not particularly limited. In addition, the data for learning of the machine learning model can be a large number of data sets in which the image for learning of the tire T and the correct answer data are combined. The correct answer data is, for example, a label corresponding to each type of uneven wear including a state in which there is no uneven wear.

As described above, when the type of uneven wear is estimated in the estimation system 5, the determination unit 10C of the estimation device 1 may determine the recommended countermeasure in more detail, or may acquire information on the attachment position of the tire T together and determine the recommended pattern by further subdividing recommended patterns. For example, when it is estimated that there is "both-side wear" in the tire T, the air pressure of the tire T is not appropriate, and the pressure of the tire T may be low. Therefore, for example, it is possible to recommend the driver to adjust the air pressure of the tire T. On the other hand, when it is estimated that there is "center wear" in the tire T, the air pressure of the tire T is not appropriate, and the pressure of the tire T may be high. Therefore, for example, it is possible to recommend the driver to adjust the air pressure of the tire T. Furthermore, when it is estimated that there is "one-side wear" in the tire T, the determination unit 10C can determine, as the recommended pattern, a rotation pattern in which the attachment positions of the tires T on left and right are reversed.

When the type of the uneven wear is estimated in the estimation system 5, the screen generation unit 10D of the estimation device 1 may generate a screen indicating the type of the uneven wear estimated for each tire T as the estimation result display screen. The type of the uneven wear may be displayed as text information, or may be displayed as graphics as in FIGS. 11A to 11D, for example. The screen generation unit 10D may further generate a rotation screen that displays a recommended pattern.

(4)

In the above embodiment, the code 60 displayed on the card 6 is generated for the URL of the front page of the dedicated website. However, in addition to or instead of the URL of the front page, the code 60 may be generated for at least one of an URL of the feedback screen G3 and an URL of the rotation screen G4 and displayed on the card 6. As a result, when accessing the dedicated website from the smartphone 3 or the like, the driver can directly access the feedback screen G3 and the rotation screen G4 without being requested to input the vehicle information on the form screen. In addition, the display of the URL may be simply written in characters, or may be a one-dimensional code, a stack-type two-dimensional code, or a matrix-type two-dimensional code other than the QR code (registered trademark). Furthermore, the card 6 is not limited to a physical card, and may be screen data imitating the card 6, and may be generated by the application 200, for example. In this case, the data of the screen imitating the card 6 may be transmitted from the smartphone 2 to the information processing terminal of the driver. Alternatively, the user may display a screen imitating the card 6 on the display 21, and the driver may photograph the screen with the driver's information processing terminal or camera.

(5)

In the above embodiment, the estimation device 1 and the server device 4 are configured as separate devices, but these devices may be integrally configured. Alternatively, the smartphone 2 may include at least a part of the functions of the estimation device 1, and the smartphone 2 may perform the estimation processing of at least one of the uneven wear and the wear amount of the tire T. In this case, the application 200 may be configured as a program in which the functions of the first machine learning model 130 and the second machine learning model 131 that have been trained, and the program 132 are incorporated, and the smartphone 2 including the functions of the estimation device 1 may be produced by installing the application 200 in the smartphone 2. In the above embodiment, the user provides a service for the driver using the smartphone 2 in which the application 200 is installed. However, the estimation system 5 may be configured such that the driver installs the application 200 on his/her smartphone 3, takes an image of the tire T of the vehicle by himself/herself, and executes the estimation processing of at least one of the uneven wear and the wear amount of the tire T. Furthermore, the camera that takes an image of the tire T and generates the image data 201 is not limited to a camera built in various information processing terminals, and may be a digital camera, a video camera, or the like dedicated to imaging.

(6)

In addition to the CPU and the GPU, the control unit 10 of the estimation device 1 may include a vector processor, a field programmable gate array (FPGA), an application specific integrated circuit (ASIC), other artificial intelligence dedicated chips, and the like.

(7)

In the above embodiment, the first machine learning models 130A to C and the second machine learning models 131A to C are generated according to the types of the tires, but only one first machine learning model 130 and one second machine learning model 131 may be generated, or conversely, may be generated for more types. Furthermore, the estimation device 1 may be configured to appropriately perform image processing such as resizing and trimming when inputting the image data 201 to the machine learning model.

(8)

The start screen, the imaging instruction screen G1, the monitor screen G2, and the start confirmation screen displayed on the display 21 in steps S21 to S24 of the above embodiment may be screens incorporated in the application 200 or screens configured as the web data 7. Further, the configurations of these user interface screens can be appropriately changed. The imaging instruction screen G1 and the feedback screen G3 may not be divided into four by a box, for example, and may be configured such that information on one tire T is displayed for one screen, and tires T can be switched by a tab. In addition, graphics C8 to C11 representing the estimation results of the uneven wear, graphics C12 to C15 representing the estimation results of the wear amounts, graphics C16 to C19 representing the determination results, graphics C20 representing the vehicle, and graphics C21 to C24 representing tire rotation or replacement may be appropriately changed, and may be configured in a moving image format.

REFERENCE SIGNS LIST

1: Estimation device
2: Smartphone
3: Smartphone
4: Server device
5: Estimation system
10: Control unit
10A: Image acquisition unit
10B: Derivation unit
10C: Determination unit
10D: Screen generation unit
130: First machine learning model
131: Second machine learning model

The invention claimed is:
1. A tire state estimation method comprising:
acquiring an image of a tread of a target tire from a front side, the image being obtained such that the image includes both ends of the tread and the tread is continuous in a predetermined direction;
inputting the acquired image to a trained first machine learning model;
deriving an output from the trained first machine learning model;
determining whether or not the target tire is required to be replaced based on the output derived from the trained first machine learning model;
inputting the acquired image to a trained second machine learning model that is different from the first machine learning model; and
deriving an output from the trained second machine learning model, wherein the output from the trained first machine learning model corresponds to an estimation result of uneven wear of the target tire,
wherein the output from the trained second machine learning model corresponds to an estimation result of a depth of a groove of the tread of the target tire, and
wherein the determining whether or not the target tire is required to be replaced is determining whether or not the target tire is required to be replaced based on the output derived from the trained first machine learning model and the output derived from the trained second machine learning model.

2. The tire state estimation method according to claim 1, further comprising:
generating a determination result display screen that displays a result of the determination as to whether or not the target tire is required to be replaced.

3. The tire state estimation method according to claim 2, further comprising:
bringing data of the determination result display screen into an accessible state via a first network; and
generating a two-dimensional code for accessing the data of the determination result display screen via a second network.

4. The tire state estimation method according to claim 1, wherein the estimation result of the uneven wear of the target tire is an estimation result of a degree of uneven wear of the tread, and represented by an index indicating the degree of the uneven wear in stages.

5. The tire state estimation method according to claim 4, further comprising:
generating an estimation result display screen that displays an index corresponding to the output derived from the first machine learning model together with positioning of the index indicating the degree of the uneven wear in stages with respect to entire indexes.

6. The tire state estimation method according to claim 5, further comprising:
bringing data of the estimation result display screen into an accessible state via a first network; and
generating a two-dimensional code for accessing the data of the estimation result display screen via a second network.

7. The tire state estimation method according to claim 1, wherein the estimation result of the uneven wear of the target tire is an estimation result of a type of the uneven wear.

8. The tire state estimation method according to claim 1, further comprising:
acquiring information on an attachment position of the target tire on a vehicle; and
determining a recommended pattern based on the acquired information on the attachment position and the output derived from the first machine learning model, the recommended pattern being a tire rotation pattern that is recommended.

9. The tire state estimation method according to claim 8, further comprising:
generating a rotation screen that displays the determined recommended pattern.

10. The tire state estimation method according to claim 1, further comprising:
preparing data for learning that is a data set of an image for learning and correct answer data, the image for learning obtained such that the image includes both ends of a tread of a tire and the tread is continuous in the predetermined direction; and adjusting a parameter of a machine learning model such that using the data for learning, data corresponding to the correct answer data is output when the image of the tread of the target tire is input, wherein the correct answer data is at least one of an index indicating a degree of uneven wear of the tire in the image for learning and a label corresponding to a type of the uneven wear of the tire in the image for learning.

11. A tire state estimation device comprising:

an image acquirer that acquires an image of a tread of a target tire from a front side, the image being obtained such that the image includes both ends of the tread and the tread is continuous in a predetermined direction;

a memory that stores a trained first machine learning model; and a deriver that inputs the acquired image to the trained first machine learning model, and derives an output from the trained first machine learning model, wherein the output from the trained first machine learning model corresponds to an estimation result of uneven wear of the target tire, wherein the memory further stores a trained second machine learning model that is different from the trained first machine learning model, the deriver further inputs the acquired image to the trained second machine learning model, and further derives an output from the trained second machine learning model, and the output from the trained second machine learning model corresponds to an estimation result of a depth of a groove of the tread of the target tire.

12. The tire state estimation device according to claim 11, further comprising:

a screen generator that generates an estimation result display screen that displays the estimation result corresponding to the output derived from the trained machine learning model.

13. A tire state estimation system comprising:

the estimation device according to claim 12;

a camera that obtains an image of the tread of the target tire; and a display that displays the estimation result display screen.

14. The tire state estimation device according to claim 11, further comprising:

a determiner that determines whether or not the target tire is required to be replaced based on the outputs derived respectively from the trained first machine learning model and from the trained second machine learning model.

15. A non-transitory computer-readable medium storing a tire state estimation program that causes a computer to execute the steps comprising:

acquiring an image of a tread of a target tire from a front side, the image being obtained such that the image includes both ends of the tread and the tread is continuous in a predetermined direction;

inputting the acquired image to a trained first machine learning model; and deriving an output from the trained first machine learning model;

inputting the acquired image to a trained second machine learning model that is different from the trained first machine learning model;

deriving an output from the trained second machine learning model; and determining whether or not the target tire is required to be replaced based on the output derived from the trained first machine learning model and the output derived from the trained second machine learning model, wherein the output from the trained first machine learning model corresponds to an estimation result of uneven wear of the target tire, and wherein the output from the trained second machine learning model corresponds to an estimation result of a depth of a groove of the tread of the target tire.

* * * * *